(12) United States Patent
Guo

(10) Patent No.: US 10,662,066 B2
(45) Date of Patent: May 26, 2020

(54) NANOPARTICLE CAPSULES FOR PHOTONIC CRYSTAL COLOR DISPLAY IN MAGNETIC FIELD

(71) Applicant: THE REGENTS OF THE UNIVERSITY OF CALIFORNIA, Oakland, CA (US)

(72) Inventor: Ting Guo, El Macero, CA (US)

(73) Assignee: The Regents of the University of California, Oakland, CA (US)

( * ) Notice: Subject to any disclaimer, the term of this patent is extended or adjusted under 35 U.S.C. 154(b) by 21 days.

(21) Appl. No.: 15/621,290

(22) Filed: Jun. 13, 2017

(65) Prior Publication Data
US 2017/0341946 A1  Nov. 30, 2017

Related U.S. Application Data

(63) Continuation of application No. PCT/US2015/066475, filed on Dec. 17, 2015.
(Continued)

(51) Int. Cl.
*B32B 5/16* (2006.01)
*C01B 33/18* (2006.01)
(Continued)

(52) U.S. Cl.
CPC .............. *C01B 33/18* (2013.01); *B82Y 20/00* (2013.01); *C01G 9/02* (2013.01); *C01G 49/02* (2013.01);
(Continued)

(58) Field of Classification Search
CPC .. B82Y 20/00; C01P 2004/34; G02F 2202/00; G02F 2202/32
See application file for complete search history.

(56) References Cited

U.S. PATENT DOCUMENTS 6,562,403 B2    5/2003  Klabunde et al.
6,773,812 B2 *  8/2004  Chandler .................. B03C 1/01
                                                          428/403
(Continued)

FOREIGN PATENT DOCUMENTS

WO    2002/074431 A1    9/2002
WO    2016/100723 A1    6/2016

OTHER PUBLICATIONS

Xu et al., Synthesis and Utilization of Monodisperse Superparamagnetic Colloidal Particles for Magnetically Controllable Photonic Crystals, Chem. Mater. 2002, 14, 1249-1256 (Year: 2002).*
(Continued)

*Primary Examiner* — Hoa (Holly) Le
(74) *Attorney, Agent, or Firm* — Kilpatrick Townsend and Stockton LLP

(57) ABSTRACT

Described are composite photonic materials that incorporate magnetic nanoparticles inside hollow or solvent-filled nano-scale or micro-scale shells and methods of making and using such composite photonic materials. When these photonic materials are present in a magnetic field, they exhibit a change in reflected, scattered, and/or transmitted light as compared to when the materials are not in the presence of the magnetic field. This results in the materials appearing to have a different color, such as when observed by the human eye or a light detecting device, such as a camera.

23 Claims, 15 Drawing Sheets

Related U.S. Application Data

(60) Provisional application No. 62/094,027, filed on Dec. 18, 2014.

(51) Int. Cl.
*B82Y 20/00* (2011.01)
*C01G 49/02* (2006.01)
*G02F 1/09* (2006.01)
*C01G 9/02* (2006.01)

(52) U.S. Cl.
CPC .......... *G02F 1/091* (2013.01); *C01P 2004/04* (2013.01); *C01P 2004/34* (2013.01); *G02F 2001/094* (2013.01); *G02F 2202/32* (2013.01)

(56) References Cited

U.S. PATENT DOCUMENTS

| | | | | |
|---|---|---|---|---|
| 7,449,237 | B2* | 11/2008 | Chan | B01J 13/02 428/403 |
| 7,745,001 | B2* | 6/2010 | Rosenzweig | B82Y 15/00 428/402 |
| 2010/0224823 | A1 | 9/2010 | Yin et al. | |
| 2011/0180745 | A1 | 7/2011 | Margutti et al. | |

OTHER PUBLICATIONS

Zhu et al, Rattle-Type Fe3O4@SiO2 Hollow Mesoporous Spheres as Carriers for Drug Delivery, Small 2010, 6, No. 3, 471-478 (Year: 2010).*

Bamnolker et al, New solid and hollow, magnetic and non-magnetic, organic-inorganicmonodispersed hybrid microspheres: synthesis and characterization, Journal of Materials Science Letters 16 (1997) 1412-1415 (Year: 1997).*

Zhang et al, Magnetic Hollow Spheres of Periodic Mesoporous Organosilica and Fe3O4 Nanocrystals: Fabrication and Structure Control, Adv. Mater. 2008, 20, 805-809 (Year: 2008).*

Bourgeat-Lami et al., Encapsulation of Inorganic Particles by Dispersion Polymerization in Polar Media, Journal of Colloid and Interface Science, vol. 197, Article No. CS975265, 1998, pp. 293-308.

Cavaliere-Jaricot et al., Au-Silica Nanoparticles by "Reverse" Synthesis of Cores in Hollow Silica Shells, Chem. Commun., 2007, pp. 2031-2033.

Chen et al., Facile and Scalable Synthesis of Tailored Silica "Nanorattle" Structures, Adv. Mater., vol. 21, 2009, pp. 3804-3807.

Ding, Silica Nanoparticles Encapsulated by Polystyrene Via Surface Grafting and In Situ Emulsion Polymerization, Materials Letters, vol. 58, 2004, pp. 3126-3130.

Feyen et al., Regioselectively Controlled Synthesis of Colloidal Mushroom Nanostructures and Their Hollow Derivatives, J. Am. Chem. Soc. vol. 132, 2010, pp. 6791-6799.

Fujiwara et al., Preparation and Formation Mechanism of Silica Microcapsules (Hollow Sphere) by Water/Oil/Water Interfacial Reaction, Chem. Mater., vol. 16, No. 25, 2004, pp. 5420-5426.

Ge et al., Responsive Photonic Crystals, Angewandte Chemie International Edition, vol. 50, Issue 7, Feb. 2011, pp. 1492-1522.

Ge et al., Synthesis of Porous Hollow Silica Spheres Using Polystyrene-Methyl Acrylic Acid Latex Template at Different Temperatures, Journal of Physics and Chemistry of Solids, vol. 70, 2009, pp. 1432-1437.

Hah et al., New Synthetic Route for Preparing Rattle-Type Silica Particles with Metal Cores, Chem. Commun., 2004, pp. 1012-1013.

Kobayashi et al., Preparation and Properties of Silica-Coated Cobalt Nanoparticles, J. Phys. Chem. B, vol. 107, No. 30, 2003, pp. 7420-7425.

Lee et al., Bifunctional Nanoparticles Constructed Using One-Pot Encapsulation of a Fluorescent Polymer and Magnetic (Fe$_3$O$_4$) Nanoparticles in a Silica Shell$^a$, Macromol. Biosci., vol. 13, 2013, pp. 321-331.

Lu et al., Synthesis and Crystallization of Hybrid Spherical Colloids Composed of Polystyrene Cores and Silica Shells, Langmuir, vol. 20, 2004, pp. 3464-3470.

Mashimo et al., Hierarchic Template Approach for Synthesis of Silica Nanocapsules with Tuned Shell Thickness, Chem. Lett., vol. 40, 2011, pp. 840-842.

Ohnuma, A Facile Synthesis of Asymmetric Hybrid Colloidal Particles, J. Am. Chem. Soc., vol. 131, 2009, pp. 1352-1353.

Ohnuma, Metal-Polymer Hybrid Colloidal Particles with an Eccentric Structure, Langmuir, vol. 25, No. 24, 2009, pp. 13880-13887.

Okada et al., Direct Observation of Micron-sized Silica Rattles to Demonstrate Movability of Inner Spheres in the Silica Compartment Suspended in Aqueous Media, Soft Matter, vol. 8, 2012, pp. 3442-3445.

Qi et al., Preparation of Acrylate Polymer/Silica Nanocomposite Particles with High Silica Encapsulation Efficiency Via Miniemulsion Polymerization, Polymer, vol. 47, 2006, pp. 4622-4629.

Sandberg et al., Synthesis of Hollow Silica Nanospheres by Sacrificial Polystyrene Templates for Thermal Insulation Applications, Advances in Materials Science and Engineering, vol. 2013, Article ID 483651, 2013, pp. 1-6.

Sondi et al., Encapsulation of Nanosized Silica by in Situ Polymerization of tert-Butyl Acrylate Monomer, Langmuir, American Chemical Society, vol. 16, No. 23, 2000, pp. 9031-9034.

Song, Direct Preparation of Silica Hollow Spheres in a Water in Oil Emulsion System: The Effect of pH and Viscosity, Journal of Non-Crystalline Solids, vol. 352, 2006, pp. 2230-2235.

Stober et al., Controlled Growth of Monodisperse Silica Spheres in the Micron Size Range, Journal of Colloid and Interface Science, vol. 26, 1968, 1968, pp. 62-69.

Teng et al., Preparation of CdS-SiO$_2$ Core-Shell Particles and Hollow SiO$_2$ Spheres Ranging from Nanometers to Microns in the Nonionic Reverse Microemulsions, Catalysis Today, vol. 93-95, Aug. 6, 2004, pp. 651-657.

Wang et al., Preparation of Styrene/Acrylic Acid Copolymer Microspheres: Polymerization Mechanism and Carboxyl Group Distribution, Colloid Polym Sci., vol. 280, Issue 2, 2002, pp. 152-159.

Xing et al., Reducing the Symmetry of Bimetallic Au@Ag Nanoparticles by Exploiting Eccentric Polymer Shells, J. Am. Chem. Soc., vol. 132, 2010, pp. 9537-9539.

Zhang et al., Permeable Silica Shell through Surface-Protected Etching, Nano Letters., vol. 8, No. 9, 2008, pp. 2867-2871.

Zhang et al., Synthesis and Characterization of Superhydrophobic and Superparamagnetic Film Based on Maghemite-Polystyrene Composite Nanoparticles, Applied Surface Science, vol. 259, 2012, pp. 719-725.

* cited by examiner to FIG. 3D

NANOPARTICLE CAPSULES FOR PHOTONIC CRYSTAL COLOR DISPLAY IN MAGNETIC FIELD

CROSS-REFERENCE TO RELATED APPLICATIONS

The present application is a continuation of International Patent Application No. PCT/US2015/066475 filed Dec. 17, 2015, which claims the benefit of and priority to U.S. Provisional Patent Application No. 62/094,027, filed Dec. 18, 2014, which applications are herein incorporated by reference in their entirety for all purposes.

TECHNICAL FIELD

The present invention relates generally to nanoscale materials. More particularly, embodiments provide compositions, methods, and systems for creating and making use of magnetically controllable photonic materials.

BACKGROUND OF THE INVENTION

Encapsulation offers benefits to many medicinal applications by providing controlled-release of cargos while facilitating storage, transport and stability of the encapsulated content. To entrap large nanoparticles in hollow shells, two general methodologies have been used. The first general approach is to trap the desired nanoparticles in larger nanoparticles, grow a shell around the larger nanoparticles, and then remove the media between the original nanoparticles and the shells to create the final encapsulation product in hollow shells. The second general approach is to impregnate an existing shell with reactants and grow nanoparticles within the shells and a few examples of this exist.

Smaller nanoparticles have been embedded in larger solid particles. For example, 3-(trimethyoxysilyl) propylmethacrylate (MPS) modified silica particles have been coated with a polymer (Sondi et al., 2000). Polystyrene has been prepared with multiple silica nanoparticles inside (Bourgeat-Lami et al., 1998). Acrylate polymer/silica nanocomposite solid particles have been fabricated through miniemulsion polymerization (Qi et al., 2006). Oleic acid modified silica nanoparticles have been encapsulated in polystyrene by in situ emulsion polymerization (Ding et al., 2004). Fluorescent polymer (PDDF) and $Fe_3O_4$ nanoparticles have been trapped inside silica spheres (Lee et al., 2013). Monodisperse silica-coated amorphous cobalt nanoparticles have been produced (Liz-Marzan et al., 2003). Individual Au or Ag nanoparticles have been trapped in polymer particles (Ohnuma et al., 2009). Individual $Fe_2O_3$ nanoparticles have been trapped in silica shells (Feyen, 2010). Ag/Au alloy nanostructures have been trapped in polymers (Xing et al., 2010).

A single large nanoparticle has also been placed inside a hollow shell. For example, silica rattle particles with a single mobile silica core have been prepared (Okada et al., 2012). Selective-etching methods for synthesizing silica nanorattles have also been achieved (Chen et al., 2009).

Individual hollow shells have been synthesized, and most approaches for fabrication of hollow structures rely on template-assisted synthesis, using hard (polymer particles) or soft (emulsion or vesicles) templates to form shell structures. Polystyrene particles have been used as sacrificial templates for forming hollow silica shells (Sandberg et al., 2013). Surface-protected etching has also been used to prepare silica shells (Zhang, 2008). Hybrid core-shell particles have also been prepared using monodispersed polystyrene beads as templates (Xia et al., 2004). Hollow silica shells have also been prepared using polystyrene beads as the core and polyethyleneimine (PEI) as a shell template (Mashimo, 2011). Polystyrene-methyl acrylic acid latex has also been used as a template for hollow silica spheres (Ge et al., 2009). Hollow silica spheres have been prepared using water in oil (W/O) emulsion systems (Song et al., 2006). Hollow silica microcapsules have been prepared using a water/oil/water (W/O/W) emulsion (Fujiwara, 2004). Additionally, polystyrene/silica/maghemite composite particles have been prepared (Zhang et al., 2012).

Further, nanoparticles may be grown directly within a shell. For example, rattle-type silica particles with copper cores have been prepared (Koo et al., 2004). Gold cores have also been prepared directly inside hollow silica shells (Nann et al., 2007).

While the above techniques may allow preparation of individual nanoparticles of varying configurations, practical ways for preparing multiple photonic nanoparticles encapsulated within larger hollow nanoparticle shells have yet to be established. The present invention satisfies this need and provides related advantages as well.

SUMMARY OF THE INVENTION

Embodiments described herein provide composite photonic materials that incorporate magnetic nanoparticles inside hollow or solvent-filled nano-scale or micro-scale shells that may exhibit color changes in a transition between the absence and presence of a magnetic field. When these photonic materials are present in a magnetic field, they exhibit a change in reflected, scattered, and/or transmitted light as compared to when the materials are not in the presence of the magnetic field. This results in the materials appearing to have a different color, such as when observed by the human eye or a light detecting device, such as a camera. The change in reflected, scattered, and/or transmitted light properties of the composite photonic materials may be due, at least in part, to the magnetic nanoparticles being in a random orientation when in the absence of or not in the presence of a magnetic field of sufficient strength and aligning when in the presence of the magnetic field of a sufficient strength, such as a strength which magnetizes the magnetic nanoparticles and allows the magnetic nanoparticles to be attracted to one another in such a way that their magnetic poles align with one another to form 1d, 2d or 3d periodically arranged nanoparticle arrays.

Embodiments advantageously allow color changes to be imparted to other objects, such as by incorporating the composite photonic material as a pigment in the other objects. For example, a paint including the composite photonic materials may allow any object painted with the paint to exhibit color changing properties. Other embodiments of pigmented materials are contemplated, such as where the composite photonic materials are incorporated as components of the pigmented material, such as a pigmented ceramic, pigmented polymer, pigmented glass, etc.

In an exemplary embodiment, a composite photonic material comprises a hollow shell comprising an oxide material and a plurality of photonic nanoparticles comprising a magnetic material that are disposed within the hollow shell. Optionally, a composite photonic material further comprises a solvent disposed within the hollow shell and surrounding the plurality of photonic nanoparticles. Useful solvents include, but are not limited to, one or more liquids including water; alcohols, such as methanol, ethanol, propanols, butanols, pentanols, and hexanols; organic hydrocarbons, such as hexanes, butanes, pentanes, cyclohexane, and mineral oil; aromatic hydrocarbons, such as benzene, toluene, xylene, ethylbenzene; and any derivatives or mixtures of these. In particular embodiments, the solvent is $H_2O$, $C_6H_{14}$, $C_2H_6O_2$, $C_3H_8O$, $C_6H_{14}O$, mineral oil, or a mixture thereof.

As described throughout this disclosure, the plurality of photonic nanoparticles may be adapted to align and/or are aligned when in the presence of a magnetic field and may be adapted to be and/or are randomly distributed when not in the presence of the magnetic field. It will be appreciated that a magnetic field of a sufficient strength may be required to align the plurality of photonic nanoparticles, such as a magnetic field possessing a local strength greater than the earth's magnetic field. In exemplary embodiments, the plurality of photonic nanoparticles are adapted to reflect, scatter, or transmit and/or do reflect, scatter, or transmit a first wavelength of electromagnetic radiation when randomly distributed and are adapted to reflect, scatter, or transmit and/or do reflect, scatter, or transmit a second wavelength of electromagnetic radiation when aligned, the second wavelength being different than the first wavelength. Such a change in reflected, scattered, or transmitted electromagnetic radiation allows the plurality of photonic nanoparticles to optionally exhibit different observed colors when in the presence/absence of a magnetic field. For example, the first wavelength and the second wavelength of electromagnetic radiation are both optionally in the visible spectrum. In certain embodiments, the second wavelength may be varied according to the strength of the applied magnetic field. For example, progressively increasing the applied field strength may progressively blue-shift reflected, scattered, or transmitted electromagnetic radiation.

Optionally, the plurality of photonic nanoparticles are adapted to align and/or do align in the presence of the magnetic field over a short time scale, such as a time scale of less than about 200 ms. Example time scales may include periods of between 1 ms and 200 ms, between 1 ms and 150 ms, between 1 ms and 100 ms, between 1 ms and 50 ms, between 1 ms and 20 ms, between 1 ms and 15 ms, between 1 ms and 10 ms, between 1 ms and 5 ms, between 5 ms and 200 ms, between 5 ms and 150 ms, between 5 ms and 100 ms, between 5 ms and 50 ms, between 5 ms and 20 ms, between 5 ms and 15 ms, and between 5 ms and 10 ms. Additionally or alternatively, the time period in which the photonic nanoparticles align may be controlled through selection of a solvent disposed within the hollow shell and surrounding the plurality of photonic nanoparticles. For example, use of a solvent having a larger viscosity may result in the photonic nanoparticles aligning over a slower time scale than use of a solvent having a smaller viscosity. Further, other optical properties, such as optical absorption, of the composite material may be modified through selection of the solvent disposed within the hollow shell.

A variety of materials are useful for various components of the composite photonic materials described herein. For example, useful oxide materials include, but are not limited to, oxides of silicon, germanium, tin, aluminum, gallium, indium, zinc, cadmium, composite oxides including oxides of two or more of these, and composite oxides including one or more of these and one or more other metallic elements. In particular embodiments, the oxide material is $SiO_2$, $Al_2O_3$, ZnO, or mixtures thereof.

Useful magnetic materials include, but are not limited to, iron, iron oxides, nickel, nickel oxides, cobalt, cobalt oxides, composites including one or more of these and other materials, and mixtures or alloys including one or more of these. Useful magnetic materials may include ferromagnetic materials. Useful magnetic materials may include paramagnetic materials. Useful magnetic materials may include superparamagnetic materials. In particular embodiments, a magnetic material is iron oxide, an iron oxide composite material, or mixtures thereof. Magnetic nanoparticles may include iron oxide nanoparticles or iron oxide composite nanoparticles. Iron oxide nanoparticles may include maghemite or magnetite. Iron oxide composite materials may include iron oxide nanoparticles in which the surface is modified and/or coated by a surfactant, silica, acid or other surface treatment. For example, one iron oxide composite material useful with aspects described herein include iron oxide nanoparticles that are coated with a silica shell. In addition, the silica shell of such a composite material may be modified or treated to establish surface functional groups on the surface of the silica shell.

A variety of dimensions may also be useful for various components of the composite photonic material. For example, the plurality of photonic nanoparticles are optionally characterized by substantially the same diameter. Useful photonic nanoparticles include, but are not limited to, photonic nanoparticles that are characterized by a diameter of about 5 nm to about 500 nm. Example photonic nanoparticle diameters include those of between 5 nm and 250 nm, between 5 nm and 100 nm, between 5 nm and 50 nm, between 10 nm and 250 nm, between 10 nm and 100 nm, between 10 nm and 50 nm, between 50 nm and 250 nm, between 50 nm and 200 nm, between 50 nm and 100 nm, between 100 nm and 250 nm, between 100 nm and 200 nm, and about 5, 10, 20, 30, 40, 50, 60, 70, 80, 90, 100, 110, 120, 130, 140, 150, 160, 170, 180, 190, 200, 210, 220, 230, 240, or 250 nm. In particular embodiments, the photonic nanoparticles are characterized by a diameter of about 200 nm. Useful hollow shells include, but are not limited to, hollow shells that are characterized by a diameter of about 1 μm to about 10 μm. Example hollow shell diameters include those of between 1 μm and 5 μm, between 5 μm and 10 μm, between 1 μm and 2 μm, between 1.5 μm and 2.5 μm, between 1.5 μm and 2 μm, and about 1, 1.1, 1.2, 1.3, 1.4, 1.5, 1.6, 1.7, 1.8, 1.9, 2, 2.5, 3, 3.5, 4, 4.5, 5, 5.5, 6, 6.5, 7, 7.5, 8, 8.5, 9, 9.5, or 10 μm. In particular embodiments, the hollow shell is characterized by a diameter of about 1.7 μm. In some embodiments, the plurality of photonic nanoparticles comprises at least 2, 3, 4, 5, 6, 7, 8, 9, 10, 15, 20, 25, 30, 35, 40, 45, 50, or more photonic nanoparticles within a single hollow shell. In particular embodiments, the plurality of photonic nanoparticles comprises 5 or more photonic nanoparticles within a single hollow shell. The plurality of photonic nanoparticles may align in a single row when present within a magnetic field. Alternatively or additionally, the plurality of photonic nanoparticles may align in a multiple row configuration when present within a magnetic field.

In another aspect, methods of changing the color of an object are provided. For example, a method of this aspect may include changing the color of an object comprising a composite photonic material, such as described above. In various embodiments, a method of this aspect comprises: applying a magnetic field to an object, such as an object comprising a composite photonic material described herein, such that the plurality of photonic nanoparticles transitions from a randomly distributed arrangement to an aligned arrangement in the presence of the magnetic field. Optionally, the plurality of photonic nanoparticles reflect, scatter, or transmit a first wavelength of electromagnetic radiation in the visible spectrum when in the randomly distributed arrangement. Optionally, the plurality of photonic nanoparticles reflect, scatter, or transmit a second wavelength of electromagnetic radiation in the visible spectrum when in the aligned arrangement, the second wavelength being different than the first wavelength. In this way, the color of the object may be changed through application of a magnetic field. Further optionally, the second wavelength may be varied according to the strength of the applied magnetic field. For example, progressively increasing the applied field strength may progressively blue-shift reflected, scattered, or transmitted electromagnetic radiation.

In another aspect, methods of preparing a composite photonic material are provided. For example, in various embodiments, a method of this aspect comprises: aggregating a plurality of photonic nanoparticles comprising a magnetic material; coating the plurality of photonic nanoparticles with a polymer material; forming an oxide material around the coated plurality of photonic nanoparticles; and removing the polymer material to form a hollow shell comprising the oxide material within which the plurality of photonic nanoparticles are disposed. Optionally, the method may further comprise applying heat to the composite photonic material to cure the hollow shell.

Optionally, methods of this aspect further comprise introducing a solvent within the hollow shell and surrounding the plurality of photonic nanoparticles. Introducing the solvent optionally comprises evacuating the composite photonic material; and dissolving the composite photonic material in the solvent. Optionally, introducing the solvent includes creating an opening in the hollow shell. Additionally, the hollow shell may be sealed after introducing the solvent. In exemplary embodiments, sealing the hollow shell comprises forming an additional oxide material on an outer surface of the hollow shell, such as an additional oxide material selected from the group consisting of $SiO_2$, $Al_2O_3$, and ZnO. Other oxide materials, such as those contemplated above for the shell of the composite photonic material, may be used for the additional oxide material. For example, useful oxide materials include, but are not limited to, oxides of silicon, germanium, tin, aluminum, gallium, indium, zinc, cadmium, composite oxides including oxides of two or more of these, and composite oxides including one or more of these and one or more other metallic elements.

As noted previously, the viscosity of the solvent may determine a time scale over which the plurality of photonic nanoparticles transitions from an aligned arrangement in the presence of a magnetic field to a randomly distributed arrangement when not in the presence of the magnetic field or vice versa. Such reorientation may optionally occur over a time scale of 200 ms or less for various embodiments. Example time scales may include periods of between 1 ms and 200 ms, between 1 ms and 150 ms, between 1 ms and 100 ms, between 1 ms and 50 ms, between 1 ms and 20 ms, between 1 ms and 15 ms, between 1 ms and 10 ms, between 1 ms and 5 ms, between 5 ms and 200 ms, between 5 ms and 150 ms, between 5 ms and 100 ms, between 5 ms and 50 ms, between 5 ms and 20 ms, between 5 ms and 15 ms, and between 5 ms and 10 ms. Optionally, the plurality of photonic nanoparticles reflect, scatter, or transmit a first wavelength of electromagnetic radiation in the visible spectrum when in the randomly distributed arrangement. Additionally, the plurality of photonic nanoparticles may reflect, scatter, or transmit a second wavelength of electromagnetic radiation in the visible spectrum when in the aligned arrangement, with the second wavelength being different than the first wavelength. Optionally, the second wavelength may be varied according to the strength of the applied magnetic field. For example, progressively increasing the applied field strength may progressively blue-shift reflected, scattered, or transmitted electromagnetic radiation.

In some embodiments, forming the hollow shell includes removing the polymer material from within the shell of oxide material. Optionally, removing the polymer material comprises performing a removal process at a temperature of about 300° C. to about 550° C. Useful temperatures for the removal process include those between 300° C. and 500° C., between 350° C. and 500° C., between 400° C. and 500° C., and about 500° C. Useful removal processes include, but are not limited to, removal processes elected from the group consisting of chemical etching and calcination.

A variety of materials are useful with the methods of this aspect including those described above in reference to the composite photonic materials. For example, in one embodiment, the oxide material may be selected from the group consisting of $SiO_2$, $Al_2O_3$, and ZnO. In one embodiment, the magnetic material may be selected from the group consisting of an iron oxide and an iron oxide composite material. Optionally, the polymer material comprises a thermoplastic polymer, such as polystyrene, poly(methyl methacrylate), nylon, polyester, polycarbonate, polyethylene, polypropylene, polyvinyl chloride, poly(ethylene terephthalate), and any combination of these. Optionally, the polymer material comprises a thermoset polymer, such as a polyester, a polyurethane, a polyimide, and any combination of these. In example embodiments, the polymer material comprises polystyrene, $(C_8H_8)_n$. Optionally, the solvent comprises one or more members selected from the group consisting of $H_2O$, $C_6H_{14}$, $C_2H_6O_2$, $C_3H_8O$, $C_6H_{14}O$, and mineral oil. Optionally, the solvent comprises one or more liquids selected from the group consisting of water, hexane, ethanol, ethylene glycol, propanol, hexanol, and isomers of these.

These and other embodiments of the invention along with many of its advantages and features are described in more detail in conjunction with the text below and attached figures.

DETAILED DESCRIPTION OF THE INVENTION

I. Introduction

Figure 1:
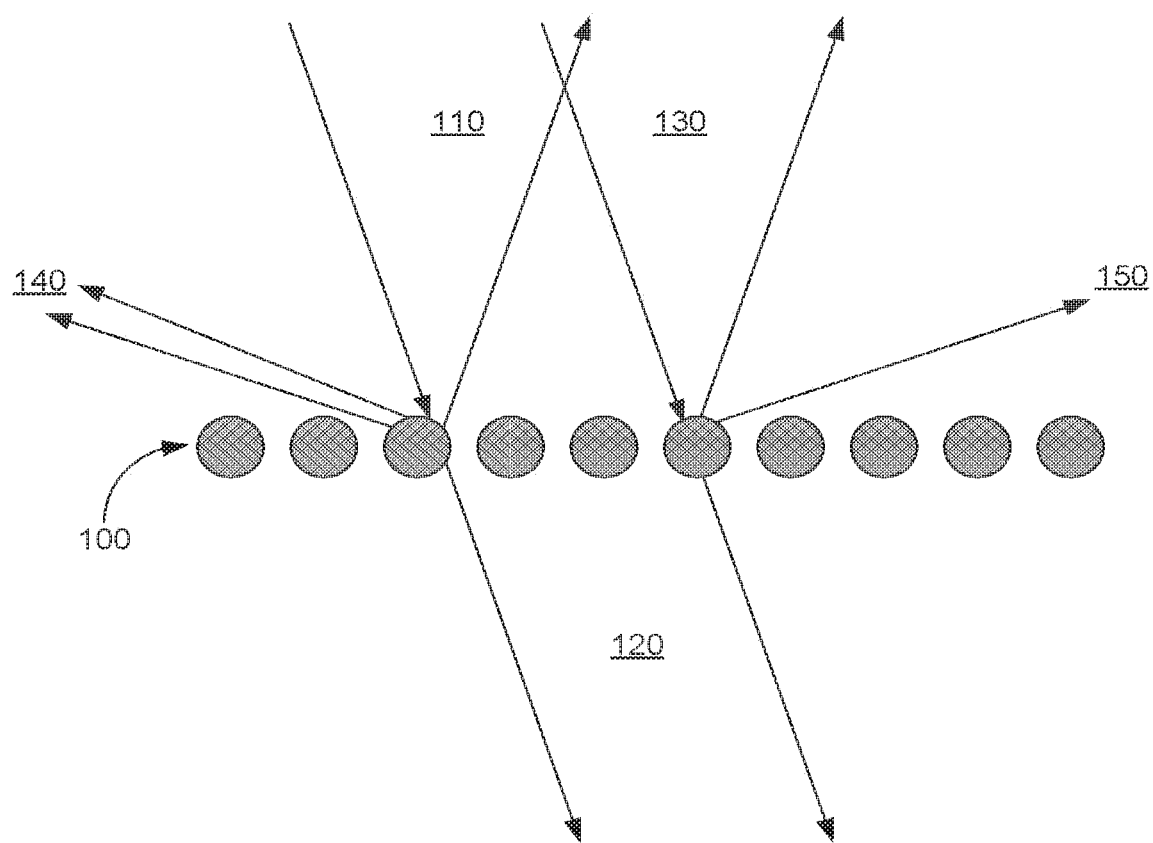
FIG. 1 provides a schematic illustration of a photonic crystal showing incident, transmitted, reflected, and scattered electromagnetic radiation.

The present invention is based in part on the discovery of how magnetic nanoparticles may align and exhibit photonic crystal-like properties when placed into a magnetic field. Further, composite photonic materials in which magnetic nanoparticles are encapsulated by larger shells advantageously allow small groups of the magnetic nanoparticles to be individually isolated, yet still contained, such that they can exhibit controllable optical properties. These composite particles may be provided as a pigment to other materials to allow these materials to exhibit reversible color changes when moved into or out of a magnetic field.

By carefully controlling the dimensions of the magnetic nanoparticles, the optical properties may be tuned, since it is the periodic structure of a photonic crystal that establishes the optical properties. Such control advantageously allows for creation of composite photonic materials that absorb, reflect, scatter, diffract, or transmit desired regions of the electromagnetic spectrum when in an aligned configuration, and that may be transparent or exhibit otherwise different absorption, reflection, scattering, diffraction, or transmission properties when in a non-aligned configuration.

Advantageously, a composite photonic material of the invention may be generally transparent when the photonic material is in the non-aligned configuration, such as when not in the presence of a magnetic field, and may appear colored, for example, red, orange, yellow, green, blue, violet, brown, black, grey, etc., when the magnetic nanoparticles adopt an aligned configuration, such as when in the presence of a magnetic field. Alternatively, a composite photonic material may appear a first color, such as white, when the photonic material is in the non-aligned configuration and may appear a second color, such as red, orange, yellow, green, blue, violet, brown, black, grey, etc., when the photonic material is in the aligned configuration. Alternatively, the first and second colors, corresponding to first and second wavelengths, may be any pairing of these listed colors or any other colors by which the first and second wavelengths differ from one another. When utilized in colored paint, for example, the composite photonic material may not affect the color of the paint in the non-aligned configuration, being characterized as transparent. However, when a magnetic field is applied, the composite photonic material may adjust the color of the paint, or may darken or lighten the paint to provide a differentiation thereby adjusting profile of the paint from a first wavelength to a second wavelength even if the color itself does not adjust. Such configurations may result from a plurality of photonic nanoparticles of the composite photonic material reflecting and/or scattering a first wavelength of electromagnetic radiation when randomly distributed and/or in a non-aligned configuration and reflecting and/or scattering a second wavelength of electromagnetic radiation, different from the first wavelength, when in an aligned configuration due to the presence of a magnetic field.

II. Definitions

Unless specifically indicated otherwise, all technical and scientific terms used herein have the same meaning as commonly understood by those of ordinary skill in the art to which this invention belongs. In addition, any method or material similar or equivalent to a method or material described herein can be used in the practice of the present invention. For purposes of the present invention, the following terms and phrases are defined.

The terms "a," "an," or "the" as used herein not only include aspects with one member, but also include aspects with more than one member. For instance, the singular forms "a," "an," and "the" include plural referents unless the context clearly dictates otherwise.

"Photonic materials" may refer to materials including a photonic crystal or photonic crystal-like structure or that may adopt a photonic crystal or photonic crystal-like structure upon exposure to a suitable stimulus, such as a magnetic field. Example photonic materials include microstructured or nanostructured objects or materials that may exhibit or align to adopt a spatially periodic dielectric constant, such as in the presence of a magnetic field. Materials properties, such as index of refraction and dielectric constant, and dimensions, such as the periodicity dimension, may dictate the way that electromagnetic radiation interacts with a photonic material, such as which wavelengths of electromagnetic radiation are absorbed, reflected, transmitted, diffracted, or scattered.

A "photonic nanoparticle" may refer to a nanoparticle that may be aligned in a periodic configuration with other photonic nanoparticles to form a photonic crystal or photonic crystal-like structure.

"Disposed within" may refer to a relative arrangement of objects or materials such that one object or material is surrounded by or otherwise positioned inside of another object or material. "Disposing" may refer to the process of placing one object or material within another object or material.

"Encapsulate" and "encapsulating" may refer to a process of surrounding or otherwise positioning one object or material around another object or material. In some embodiments, a material that is "disposed within" an object may interchangeably be referred to as "encapsulated."

A "hollow shell" may refer to a solid body including an internal space in which fluids may be placed or in which smaller solid bodies that do not occupy the entirety of the internal space may be placed. In some embodiments, a hollow shell is formed by removing material from within an object to generate the internal space within the object in which other materials or objects may be placed. In other embodiments, a hollow shell is formed by assembling an object around a space to form an encapsulated space that may include another object or material.

A "magnetic material" may refer to a substance that experiences an attractive force when placed within a magnetic field. Some magnetic materials may exhibit an induced magnetic moment when placed within a magnetic field, which may allow magnetic materials to be attracted to each other when present within the magnetic field. In some embodiments, a magnetic material comprises a ferromagnetic material, such as iron, nickel, cobalt and related compounds and alloys of these. In other embodiments, a magnetic material comprises a superparamagnetic material, such as $Fe_3O_4$ below the superparamagnetic-ferromagnetic transition (a domain size of approximately 30 nm for $Fe_3O_4$). As used herein, "magnetic material" may include a material that is or may be permanently magnetized, though not all magnetic materials useful with aspects described herein need to be permanently magnetized.

The term "align" may refer to a process in which objects move to adopt an aligned configuration. An "aligned configuration" and an "aligned arrangement" may refer to an orientation of objects in space such that the objects form a one-dimensional array. In embodiments, the alignment dimension of objects arranged in an aligned configuration may be parallel to magnetic field lines of an applied magnetic field. FIGS. 1 and 2B illustrate examples of objects in aligned configurations. In some embodiments, an aligned configuration may also refer to objects arranged in a plurality of aligned configurations, such as multiple one-dimensional arrays. FIG. 3F illustrates such an example.

A "randomly distributed configuration" and a "randomly distributed arrangement" may refer to an orientation of objects in space such that some, all, or a majority of the objects are not aligned or that the objects are not specifically positioned in a structured configuration. In some embodiments, objects in a random configuration is contrasted with a configuration in which the objects are aligned.

The term "solvent" may refer to a liquid or mixture of liquids that may contain dissolved or suspended solid materials.

"Dissolving" may refer to a process in which a solid is disposed within a liquid, such as a solvent. Dissolving may include processes in which individual constituents, such as nanoparticles, atoms, ions, or molecules, are separated from one another upon being placed in the liquid such that a layer of liquid molecules may be present between the individual constituents. In some embodiments, dissolving nanoparticles within a liquid may include forming a suspension of the nanoparticles in the liquid.

The terms "aggregation" and "aggregating" may refer to a process in which a plurality of objects are spatially grouped, positioned in contact with each other, or otherwise positioned in close proximity to one another.

As used herein, the symbol "@" may identify particles positioned inside of other particles. For example, "A@B" may identify that particles of "A" are disposed within particles of "B."

As used throughout, "wavelength" may refer to any wavelengths of the visible spectrum, and may include any specific wavelengths between about 380 nm to about 800 nm. Additionally, wavelengths discussed may include wavelengths extending into the ultraviolet and infrared spectrums that may be perceived in instances as well. For example, a first or second wavelength may include ultraviolet wavelengths to about 310 nm or above, as well as infrared wavelengths to about 1050 nm or below. A first or second wavelength may be any wavelength between about 310 nm and about 1050 nm in embodiments, and may differ from one another by 1 nm or more, or 400 nm or less. As used throughout, "second wavelength" may refer to a discrete wavelength of reflected, scattered, or transmitted electromagnetic radiation irrespective of the strength of an applied magnetic field as well as a wavelength of reflected, scattered, or transmitted electromagnetic radiation that varies with the strength of an applied magnetic field.

III. Description of the Embodiments

Embodiments of the present invention relate to creation and use of photonic materials. Photonic materials in an aligned configuration may exhibit different optical properties as compared to the photonic materials when in a non-aligned configuration, such as a randomly distributed configuration. For example, when in an aligned configuration, photonic materials may exhibit different optical absorption, transmission, reflection, diffraction, or scattering properties as compared to when they are in a non-aligned configuration.

FIG. 1 provides a schematic illustration of a photonic crystal 100. Incident electromagnetic radiation 110 interacts with the photonic crystal 100, where it is apportioned between transmitted electromagnetic radiation 120, reflected electromagnetic radiation 130, scattered electromagnetic radiation 140, diffracted electromagnetic radiation 150, and absorbed electromagnetic radiation. The amount and frequencies of transmitted electromagnetic radiation 120, reflected electromagnetic radiation 130, scattered electromagnetic radiation 140, diffracted electromagnetic radiation 150, and absorbed electromagnetic radiation may vary depending on the specific configuration of the photonic crystal 100. For example, the materials, dimensions, inter-element spacing, and other properties of the photonic crystal 100 may be determinative of what the apportionment may be.

Figure 2A:
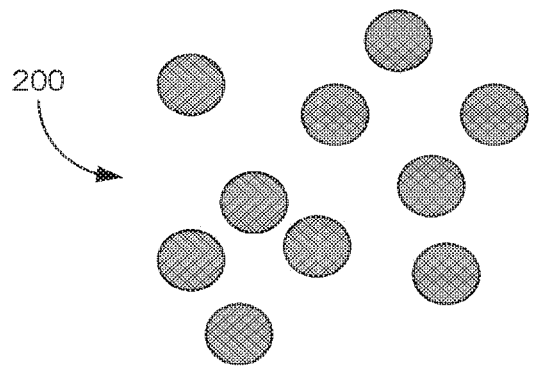
FIG. 2A provides a schematic illustration of a group of magnetic nanoparticles.
Figure 2B:
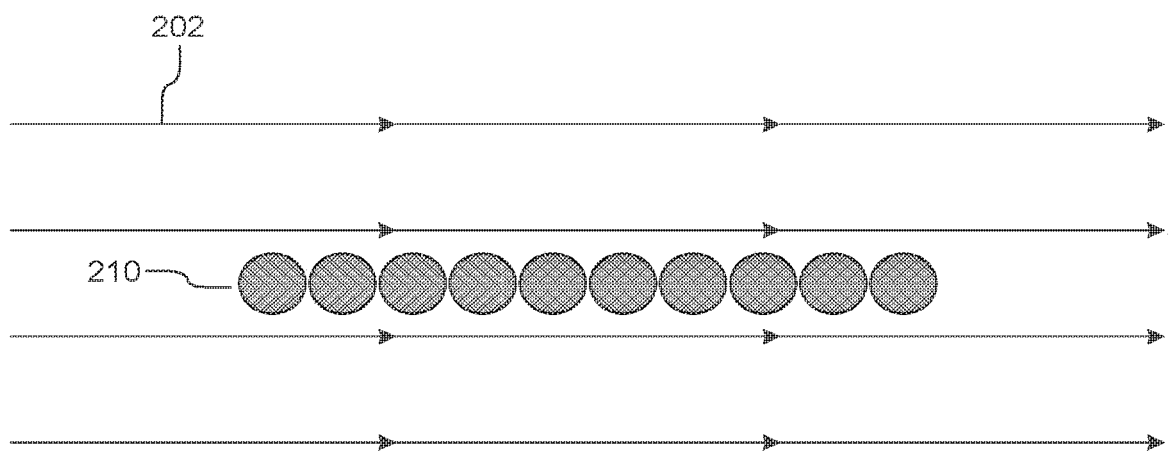
FIG. 2B provides a schematic illustration of a group of magnetic nanoparticles in the presence of a magnetic field.

FIG. 2A provides a schematic illustration of a plurality of photonic nanoparticles in a random orientation 200. Here, the plurality of photonic nanoparticles are not exposed to a magnetic field, i.e., not to a magnetic field of sufficient strength to impart magnetic dipoles to the photonic nanoparticles. In FIG. 2B, the plurality of photonic nanoparticles are exposed to a magnetic field, illustrated in FIG. 2B as field lines 202, where they rearrange to form an aligned configuration 210. The aligned configuration may be created by inducing magnetic dipoles in each photonic nanoparticle through exposure to the magnetic field such that each photonic nanoparticle is attracted to its neighbors. Although the aligned configuration 210 is illustrated as a single row (1d), embodiments are contemplated where the aligned configuration contains multiple rows of photonic nanoparticles, which may be single rows in a spaced (multiple 1d) or side-by-side configuration (2d) or in a 3d array.

Figure 2C:
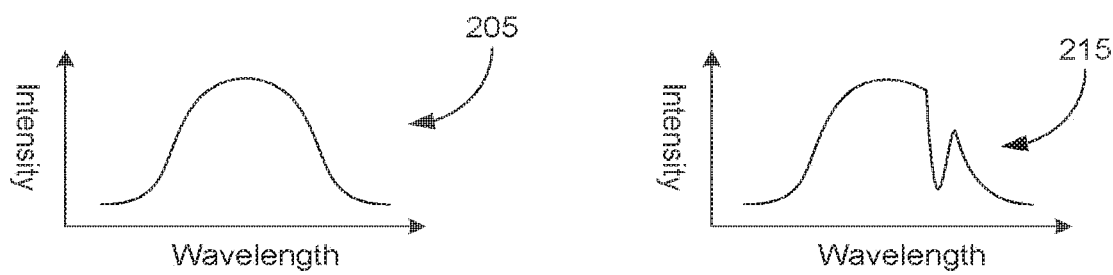
FIG. 2C depicts example transmission spectra of the magnetic nanoparticles shown in FIGS. 2A and 2B.

FIG. 2C provides a schematic illustration of example transmission spectra of the plurality of photonic nanoparticles. The left spectrum 205 in FIG. 2C shows that the plurality of photonic nanoparticles in the random orientation 200 may be transparent or exhibit a first transmission spectrum. The right spectrum 215 in FIG. 2C shows that the plurality of photonic nanoparticles in the aligned orientation 210 may exhibit a different transmission spectrum, such as where a portion of the electromagnetic radiation is absorbed, reflected, diffracted, or scattered, for example. From an observational perspective, the aligned configuration 210 would appear to be a different color from the random orientation 200 due to the difference in absorption, reflection, diffraction or scattering of electromagnetic radiation. The random orientation 200 may thus be observed as exhibiting a first wavelength of electromagnetic radiation and the aligned orientation 210 may be observed as exhibiting a second wavelength of electromagnetic radiation. Accordingly, when transitioned from a random to an aligned orientation, the color of the photonic nanoparticles may be observed to change. As discussed previously, this change may be from a first color to a second color of the visible spectrum, or may be a lighter or darker shade of the same color, for example.

Figure 3A:
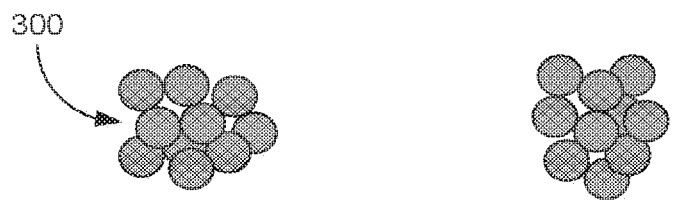
FIG. 3A provides a schematic illustration of aggregated magnetic nanoparticles or magnetic nanoparticle aggregates.
Figure 3B:
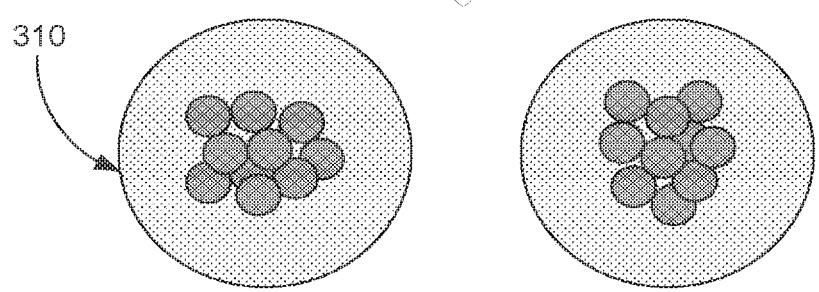
FIG. 3B provides a schematic illustration of polymer coated magnetic nanoparticle aggregates.
Figure 3C:
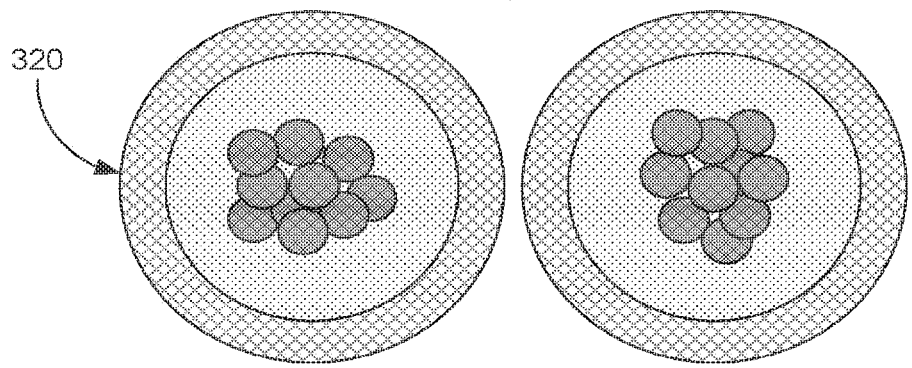
FIG. 3C provides a schematic illustration of coated magnetic nanoparticle aggregates covered with a shell, such as comprising an oxide material.
Figure 3D:
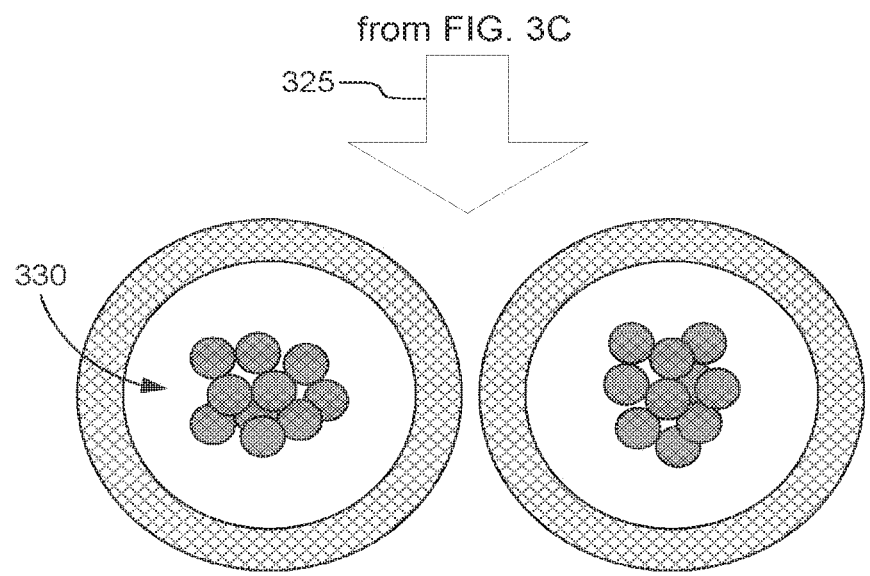
FIG. 3D provides a schematic illustration of magnetic nanoparticle aggregates surrounded by a hollow shell.
Figure 3E:
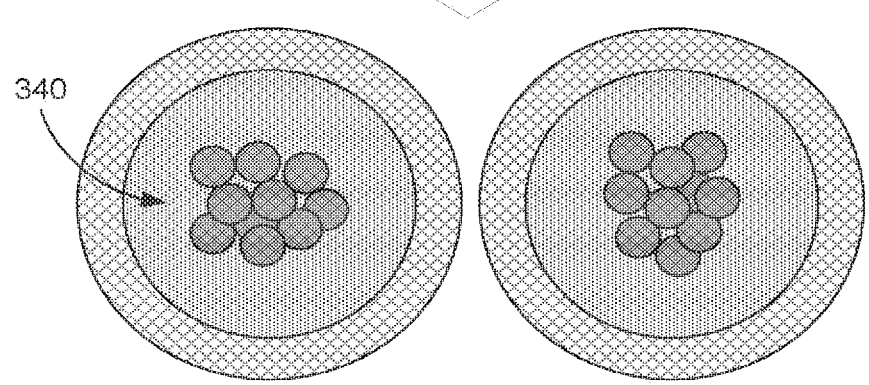
FIG. 3E provides a schematic illustration of magnetic nanoparticle aggregates surrounded by a shell filled with a solvent.
Figure 3F:
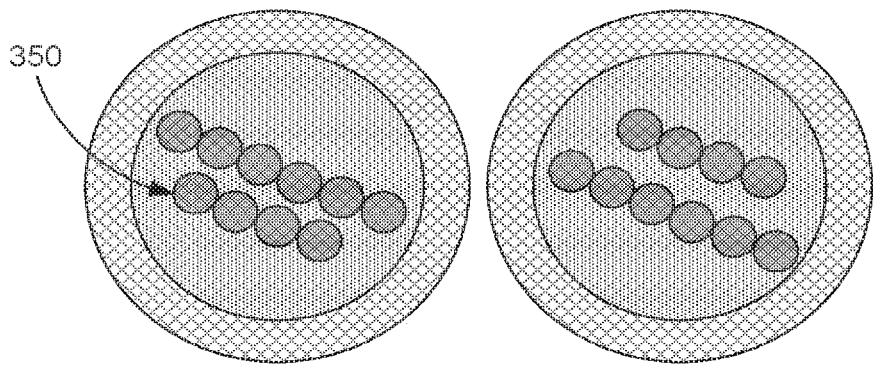
FIG. 3F provides a schematic illustration of magnetic nanoparticle aggregates surrounded by a solvent filled shell in the presence of a magnetic field. Together, FIGS. 3A-3F provide an overview of a method embodiment of the invention for preparing a composite photonic material.

FIGS. 3A-3F provide schematic illustrations of aspects of methods of preparing a composite photonic material. In FIG. 3A, aggregates 300 of a plurality of photonic nanoparticles are generated, for example, nanoparticles comprising a magnetic material, such as iron oxide nanoparticles, composite nanoparticles comprising iron oxide, silica-coated iron oxide nanoparticles, or nanoparticles comprising other magnetic materials. Although not so limited, the number of photonic nanoparticles in a single aggregate may range from about 3 to about 50. By way of example, for a photonic crystal that may display strong colors, about 10 to about 20 photonic nanoparticles may be included in each aggregate. Such aggregation may occur through a variety of processes. For example, aggregation may occur through use of a magnetic field to group the photonic nanoparticles. Alternatively or additionally, aggregation may occur through use of microemulsions including the photonic nanoparticles. Alternatively or additionally, aggregation may occur by attaching or coating the photonic nanoparticles to a surface of pre-formed nanoparticles, such as on preformed polystyrene nanoparticles through conjugation. Alternatively or additionally, aggregation may occur through surface treatment of the photonic nanoparticles, such as by including or attaching molecules which attract like molecules on the surface of the photonic nanoparticles. Various surface treatments or coatings may impart desirable properties to the photonic nanoparticles, such as coating the photonic nanoparticles with a layer of an oxide material and/or treating the surface of the photonic nanoparticles with coupling agents, functionalizing agents, acids, bases, or other compositions for modifying the photonic nanoparticle surfaces. Useful coupling and functionalization agents include, but are not limited to, nucleic acid molecules and organo-alkoxysilane molecules. Such surface treatment may be useful, for example, for inducing coating the photonic nanoparticles in later steps.

After a polymer coating process 305, FIG. 3B illustrates the aggregates 300 coated with a polymer material 310, such as a polystyrene coating. The coating may be controlled so that different sizes of polystyrene beads may be obtained, as desired. For example, longer coating times may result in larger diameter polymer coatings. As described above, the aggregated photonic nanoparticles may be chemically treated before coating, and the surface treatment may also impact the characteristics of the resultant polymer coatings. It will be appreciated by reference to FIGS. 3C-3F that the size of the polymer coating may determine the final inner diameter of the composite photonic nanoparticles, as the polymer coating may be removed through a removal process in a later step. Additionally, after coating the aggregates 300 with the polymer 310, the surface of polymer 310 may optionally undergo surface treatment, such as by exposure to functionalizing agents, coupling agents, etchants, acids, bases, etc., in order to prepare the surface of polymer 310 for receiving additional layers thereon, such as by establishing a negative surface charge on polymer 310.

After an oxide coating process 315, FIG. 3C illustrates the polymer 310 coated with a layer of an oxide material 320. The oxide material may be formed through a variety of processes, such as oxidation of an aqueous metal or semiconductor composition in the presence of the polymer 310 coated aggregates 300. For example, silanes may be used to generate the layer of oxide material 320 as a silica layer. Optionally, the thickness of the silica layer may be controlled by varying the concentration of the silane compounds in the aqueous environment. For example, tetraethoxysilane may be used as a silica precursor.

Additional characteristics of the polymer coating 310 and aqueous environment may be useful for controlling the thickness of the layer of oxide material 320 generated in the oxide coating process 315. For example, the pH of the aqueous environment may impact the rate at which the oxide material precursors may attach to the outer surface of polymer coating 310. This may occur, at least in part, due to surface charge characteristics of the polymer coating 310 being dependent upon the pH of the aqueous environment. Alternatively or additionally, the polymer coating 310 may be exposed to structure-directing agents, which may attach to the surface of the polymer coating 310 through electrostatic attraction.

After a removal process 325, FIG. 3D illustrates a hollow region 330 formed upon removal of polymer coating 310 from within the surrounding layer of oxide material 320. A variety of removal processes may be utilized for removing polymer coating 310 to form hollow region 330. For example, the polymer coating 310 may be removed through a chemical etching process. Alternatively or additionally, the polymer coating 310 may be removed through a calcination process, such as a calcination process at relatively high temperatures, such as about 300 to about 500° C. As a result of the removal process, the photonic nanoparticles are trapped inside the oxide material 320 shells. Depending on the processing conditions, an aqueous solution may displace the polymer coating 310 in hollow region 330 at the end of the removal process.

FIG. 3E depicts the structure of the composite photonic material after a solvent introduction process 335 in which solvent 340 is added inside the shells of oxide material 320 and surrounding the aggregates 300. Various solvents, such as $H_2O$, $C_6H_{14}$, $C_2H_6O_2$, $C_3H_8O$, $C_6H_{14}O$, or mineral oil, and mixtures of these and other solvents are useful for this process and may impact the rate at which the photonic nanoparticles may rearrange in response to exposure to a magnetic field. For example, the viscosity of solvent 340 may allow for selection of the rate at which the photonic nanoparticles rearrange when exposed to a magnetic field. The viscosity may be tuned by selection of a mixture of various solvents included in solvent 340. In addition, the solvent 340 may impact other optical properties of the composite photonic nanoparticles, such as the absorption spectrum. In embodiments the solvents may include additional or alternative alkanes, which may or may not include branched methoxy functional groups.

The process 335 of introduction of solvent 340 inside the shell of oxide material 320 may occur through dispersing the shells of oxide material 320 in the solvent and allowing time to pass during which the solvent fills into the hollow region 330. Such a process may be referred to herein as dissolving the shells of oxide material 320 in the solvent. Introduction may occur directly upon placing the shells of oxide material 320 in contact with the solvent, as the oxide material 320 may be porous. Mechanical agitation, such as stirring, shaking, sonication, or other techniques for mechanically mixing the shells and solvent, may aid in filling hollow region 330 with solvent 340.

Optionally, additional processing of the composite nanoparticles may be used to patch, seal, repair, or otherwise modify the shell of oxide material 320 after introduction of the solvent 340 into the shell. For example, additional layers made of the same or different oxides may be deposited over the shell of oxide material 320. For example, the shell of oxide material 320 may comprise silica and the additional oxide may comprise alumina and/or zinc oxide. Additional materials that may be oxide material 320 or included as one or more of the layers of oxide material 320 may include other amphoteric oxides including copper, tin, lead, and beryllium, for example. Additionally or alternatively, the shells may be cured through a heating process. In this way, additional encapsulation may result in a less porous shell, such that solvent 340 may not be able to escape. Additionally or alternatively, these additional processing steps may result in the shells having a greater optical transparency.

FIG. 3F provides a schematic illustration of the composite nanoparticles upon exposure 345 to a magnetic field. When the composite nanoparticles are in the presence of a magnetic field of sufficient strength, the photonic nanoparticles adopt an aligned configuration 350, that may align parallel to the magnetic field lines, as illustrated in FIG. 2B. Advantageously, this allows the photonic nanoparticles to behave like or to be a photonic crystal, allowing the photonic nanoparticles to interact with electromagnetic radiation in a different manner than when in a non-aligned configuration. From an observational perspective, the photonic nanoparticles, when in aligned configuration 350, will appear a different color than when the photonic nanoparticles are in a non-aligned configuration, such as by reflecting a wavelength in the aligned configuration different from a reflected wavelength in the non-aligned configuration.

The composite photonic materials described herein may be useful in many different types of applications in accordance with various embodiments and/or aspects of the invention. For example, it may be useful to temporarily record the impact of an object striking a surface by an active surface component as the object hits and leaves the surface. One such example is when a tennis ball strikes the court surface. There may be several aspects to consider for such a recording. First, it may be useful to generate a color change at the location of the impact. It may be marked as the center of the ball or the contour of the contact. Second, it may be useful that the spatial resolution be high, of the order of about 1 mm or less, as an example. Third, it may be advantageous if the response time for the active recording element is fast. For example, tennis balls may travel at the speed of 200 km per hour, which is 55.6 meters per second; the ball will spend 18 ms over a 1 mm track on the surface, although the landing speed is significantly slower than 200 km/hour. Thus, the response may be of the order of this timescale. Last, it may be desirable that the response of color change fades or is restored over a reasonably short time so that this recording will not overlap, confuse, or interfere with the determination of subsequent impacts. One exemplary length of time of fading is 15 seconds. Alternatively or additionally, the response may be erased by another object, such as the head of a slightly magnetized tennis racquet or other magnetized device.

Many efforts have been attempted to devise a material or scheme to accommodate these aspects. However, none to date has been shown to be effective. In some embodiments, the composite photonic materials described herein may be in the form of beads that may be embedded in the paint applied to the surface of tennis courts. Alternatively or additionally, the capsules may be sprayed onto the surface of a wet paint. A paint of different base color may be placed next to the white lines to accommodate the nanoparticle capsules. The tennis ball may contain a thin layer of magnetic material, which may be embedded in the rubber or felt cover in the tennis ball. Since the composite photonic materials described herein may have a very fast response time, for example about 20 ms or less, the materials may be suitable for recording the impact of a tennis ball hitting the surface of a tennis court containing such materials.

For some embodiments, display applications may require that relatively large nanoparticles be trapped inside isolated environments such as hollow spherical shells. For example, photonic displays may be possible if large, free to move around nanoparticles are ordered inside transparent hollow shells. Each of these assemblies may be considered as a single pixel, in some implementations. For this purpose, the size of the shells may be of the order of microns in size, for example. These large hollow spheres may be used as building blocks for photonic crystals. The nanoparticles inside may be of the order of tens to hundreds of nanometers, for example, so that they can be easily and quickly manipulated externally, e.g., using a magnetic field.

A variety of techniques are useful for the initial generation of nanoparticles. In embodiments, smaller nanoparticles may be synthesized and embedded in larger solid particles, without the outer shell. For example, coating of multiple MPS modified silica particles with tert-butyl acrylate polymer in 2-propanol may be achieved. Polystyrene with multiple silica nanoparticles inside may be prepared. Silica particles may be directly synthesized through the Stöber process and grafted with MPS (hydrophobic character). The dispersion polymerization of styrene may be conducted in aqueous ethanol medium with polyvinylpyrrolidone (PVP) as stabilizer. Acrylate polymer/silica nanocomposite solid particles through miniemulsion polymerization may also be fabricated. Silica nanoparticles may be initially grafted with MPS. Coupling treatment of silica may improve the encapsulation efficiency. Oleic acid modified silica nanoparticles may be encapsulated in polystyrene by in situ emulsion polymerization. Adjusting styrene concentration may alter polystyrene thickness, and adjusting silica concentration may allow for control over the diameter of composite particles. Fluorescent polymer (PDDF) and $Fe_3O_4$ nanoparticles may be trapped inside silica spheres. The composite particles PDDF/$Fe_3O_4$@$SiO_2$ may possess both fluorescent and magnetic properties. Monodisperse silica-coated amorphous cobalt nanoparticles may be synthesized. Controlling synthetic conditions may change the core size and the silica shell thickness. Single Au or Ag nanoparticles may be trapped in polymer particles. In addition, mushroom nanostructures may be produced by trapping $Fe_2O_3$ nanoparticles in silica shells. Ag/Au alloy nanostructures may be trapped in polymer as well.

Techniques for placing large nanoparticles inside a hollow shell may be utilized. For example, micron-sized silica rattle particles may be prepared with a single silica core that exhibit mobility of the inner silica core in the micron silica shell. Rattle structures may be obtained, for example in two steps: synthesizing silica core/polystyrene/silica shell composite structures and removing the polystyrene component. Selective-etching methods may also be used to synthesize silica nanorattles. For example, selective-etching methods may include starting with a pure silica framework hydrolyzed from tetraethylorthosilane (TEOS), coating the framework with TEOS and N-(3-(trimethoxysilyl) propyl) ethylenediamine (TSD) as the middle layer, and finally using HF to etch away this middle layer. Growing shells outside large particles may also be utilized.

Techniques for synthesizing hollow shells may be utilized, such as an approach for fabrication of hollow structures that relies on template-assisted synthesis, using hard (polymer particles) or soft (emulsion or vesicles) templates to form shell structures. By removing the middle polymer or emulsion layer with chemical dissolution or thermal calcination, a hollow structure may be created. For example, polystyrene particles may be prepared as sacrificial templates for hollow silica shells. A silica-coating process may affect surface roughness of silica shells. Permeable silica shells may be prepared using "surface-protected etching" techniques. First, solid silica nanoparticles may be prepared. PVP may then cover the surface to serve as the protecting agent on silica surface through forming strong hydrogen bonds. Selective etching may be conducted at room temperature with sodium hydroxide solution as etchant. Strong base may diffuse into the silica surface and eventually etch away the interior of the solid silica nanoparticles. Hybrid core-shell particles may be synthesized using monodispersed polystyrene beads as templates. Sub-micron to micron size polystyrene particles may be coated with a uniform silica shell, which may be controllable to a nanometer thickness. Functional groups on the surface of polymer, the pH value of the medium, and TEOS deposition time may affect the silica shell formation. Sub-micron nanoporous hollow silica shells may be prepared using polystyrene beads as hierarchic cores and polyethyleneimine (PEI) as the shell template. Carboxylate (COOH) functionalized polystyrene beads may facilitate the silica formation. Polystyrene-methyl acrylic acid latex may be prepared as a template for porous hollow silica spheres. CTAB may serve as a wall structure-directing agent and the Stöber method may be used for silica coating. A soft template-route may allow preparing hollow shell structures utilizing the liquid-liquid interface for nanoshell formation without removing the core. The formation of a micelle structure may be useful for subsequent silica shell deposition. Hollow silica spheres may be prepared using water in oil (W/O) emulsion system with the surfactant CTAB. TEOS may serve as a silica precursor. Hollow silica microcapsules may be synthesized with a water/oil/water (W/O/W) emulsion without use of a core material. Silica shells may be formed on the micelles using sodium silicate as silica source.

Nanoparticles may also be produced inside pre-made shells. A three-step chemical procedure for preparing polystyrene/silica/maghemite composite particles with superhydrophobic and superparamagnetic properties may be used.

It should be understood that composite photonic materials described herein may be useful in many other types of applications including, but not limited to, photonic display applications, medical applications, transit applications, security devices, biological and chemical sensors, military camouflage and any other suitable application where a material color change is desired.

It is to be further understood that the examples and embodiments described herein are for illustrative purposes only and that various modifications or changes in light thereof will be suggested to persons skilled in the art and are to be included within the spirit and purview of this application and scope of the appended claims.

IV. Example

The invention may be further understood by reference to the following non-limiting example.

Example 1: Encapsulation of Multiple Large Spherical Silica Nanoparticles in Hollow Spherical Silica Shells This example describes the results of a stepwise synthesis of multiple large silica nanoparticles encapsulated in hollow, micron sized silica shells, useful for display applications. In the first step, 200-nm diameter silica nanoparticles were modified with 3-(trimethoxysilyl) propylmethacrylate (MPS) coupling agent. The nanoparticles were then embedded in micron-sized polystyrene particles synthesized through dispersion polymerization. To form silica shells on the polymer composite particles, tetraethylorthosilicate (TEOS) was added with cetyltrimethylammonium bromide (CTAB) surfactant. These three steps resulted in the formation of silica shell-covered solid polystyrene particles, each containing multiple silica nanoparticles. In the last step, polystyrene content was removed via calcination to achieve a multiple-silica-core-in-hollow-silica-shell composite structure. Dynamic light scattering (DLS) analysis and transmission electron microscopy (TEM) confirmed the core/shell morphology of the composite structure.

It will be appreciated that the silica nanoparticles may be substituted throughout this example with magnetic nanoparticles, such as iron oxide nanoparticles or iron oxide composite nanoparticles, for example, iron oxide nanoparticles having a silica coating, which may be optionally modified, such as with a coupling agent.

This example also describes a systematic characterization of multiple large nanoparticles trapped in hollow shells. Silica is selected as an example material to make nanoparticles and shells, though other materials may be used. Silica is chemically inert, nontoxic, highly biocompatible and optically translucent, hence it is considered as a model material for the encapsulation process. In the following description, the dispersion polymerization of styrene in an aqueous medium was carried out in the presence of nano-sized silica particles made by the Stöber method in the hydroalcoholic medium. Silica particles were functionalized by grafting 3-(trimethoxysilyl) propyl methacrylate (MPS) on their surfaces. Mesoporous silica shell was synthesized with hexadecyl trimethyl ammoniumbromide (CTAB) as a structure-directing agent. Polystyrene was removed by calcination to obtain the shell structure. The resulting composite material is characterized by DLS and TEM. The core may be replaced with magnetic nanoparticles, gold nanoparticles and fluorescent nanoparticles for other applications.

Experimental. Tetraethoxysilane (TEOS), cetyltrimethylammonium bromide (CTAB), ammonia solution (25%), styrene (contain 4-tert-butylcatechol inhibitor), potassium persulfate (KPS, ≥99.0%), 3-(trimethoxysilyl) propyl methacrylate (MPS, 98%), chloroform, sodium hydroxide (analytical grade), concentrated hydrochloric acid (12 M), acrylic acid (99%), polyvinylpyrrolidone (PVP, MW 30 kDa) and tetrahydrofuran (THF) were purchased from Sigma Aldrich.

Monodisperse 200-nm silica particles in aqueous alcohol were prepared according to the Stöber method. 3.08 ml TEOS was quickly added to the vigorously stirred mixture of 2.38 ml water, 3.88 ml ammonia (25%) and 80 ml ethanol. The reaction mixture was stirred at room temperature for 24 h. For purification, 200 nm monodisperse silica particles were collected after centrifuging (6000 rpm, 15 min) and washing three times with ethanol. To modify the surface of the 200-nm silica particles, 700 µl of 5:1 M ratio of TEOS:MPS was added to the suspension of silica particles in ethanol under stirring. The suspension was stirred at room temperature for 24 h. To prepare 40-nm silica nanoparticles, 25 ml ethanol, 0.5 ml water, 1.5 ml ammonia and 2 ml TEOS were mixed. The reaction proceeded for 24 h. Without purification, 0.046 ml MPS was added to the mixture and stirred for an additional 72 h. Purification was the same as stated above.

The purchased styrene contained 4-tert-butylcatechol inhibitor, which was removed before use. Styrene was washed in a test tube with an equal volume of 10% NaOH solution and layers of solution were transferred and separated using a Pasteur pipette. The separation process sacrificed a small amount of styrene. A typical procedure of synthesizing polystyrene (PS) particles is as follows: First, 5 ml styrene, 0.5 ml acrylic acid, and 45 ml water were sonicated to form a uniform dispersion, and the dispersion was kept under argon atmosphere with magnetic stirring. Next, 1 ml KPS (0.025 g) aqueous solution was injected into the mixture. The polymerization reaction was carried out at 70° C. under gentle stirring for 24 h. After that, the obtained polystyrene-acrylic acid nanoparticles were collected after centrifuging (5000 rpm, 15 min) and washing three times with ethanol. The purification process was repeated three times.

The encapsulation experiment was carried out in a 100-ml three-necked flask equipped with a condenser. 4.5 g styrene (4.966 ml) monomer and 0.225 g 200-nm nanosized modified silica were added into 22.5 ml water in the latex. The mixture was dispersed by ultrasonication, and was placed under nitrogen atmosphere for 30 min. 0.0675 g KPS was added into the solution under magnetic stirring. The reaction was carried out under an argon atmosphere for 24 h at 70° C. with magnetic stirring. The composite polystyrene latex particles were obtained without post-treatment. 0.335 ml acrylic acid and 0.015 g KPS were added to the composite polystyrene latex. The mixture was kept at 70° C. for 24 h. The as-prepared template latex was centrifuged and washed three times with water.

To prepare PS coated 40 nm silica nanoparticles, 0.0855 g grafted silica nanoparticles were uniformly dispersed in 0.5225 g water and 8.9775 g ethanol. 0.19 g PVP was added under stirring. The mixture was deoxygenated by bubbling with argon for 30 min. 0.95 g styrene and 0.0095 g KPS were introduced to the reaction system after bringing the temperature to 70° C. Polymerization continued for an additional 24 h. The purification process was the same as mentioned above.

To prepare the final product, 0.5 g of composite polystyrene latex was uniformly dispersed in 15 ml water with ultrasonication for 30 min. 3 ml aqueous solution of CTAB (0.05 g) was added and kept under magnetic stirring for 2 h. Aqueous ammonia solution (25%) was used to adjust the pH to 9. 0.8 ml TEOS was added and stirred for 4 h at room temperature. Then, the mixture was kept still for another 24 h. The product was centrifuged and washed three times with ethanol. The precipitate was vacuum dried for 3 h. The as-prepared composite particles were calcinated at 550° C. for 5 h.

Particles size measurements were obtained by dynamic light scattering (DLS) (ZEN1690, Malvern). For DLS measurements, the liquid samples were diluted to be clear or slightly hazy. Data was collected from cumulant analysis automatically. Transmission electron microscopy (TEM) (JEOL 1230, 100 kV) and scanning electron microscopy (SEM) (S-4100T, FE-SEM, Hitachi) were utilized to visualize different nanostructures.

Results.

Figure 4A:
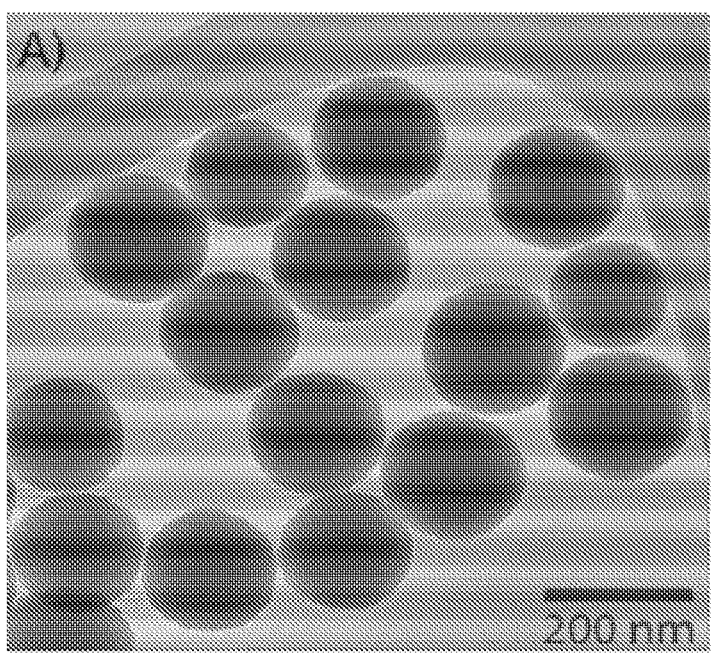
FIG. 4A provides a tunneling electron micrograph (TEM) image of $SiO_2$ nanoparticles.
Figure 4B:
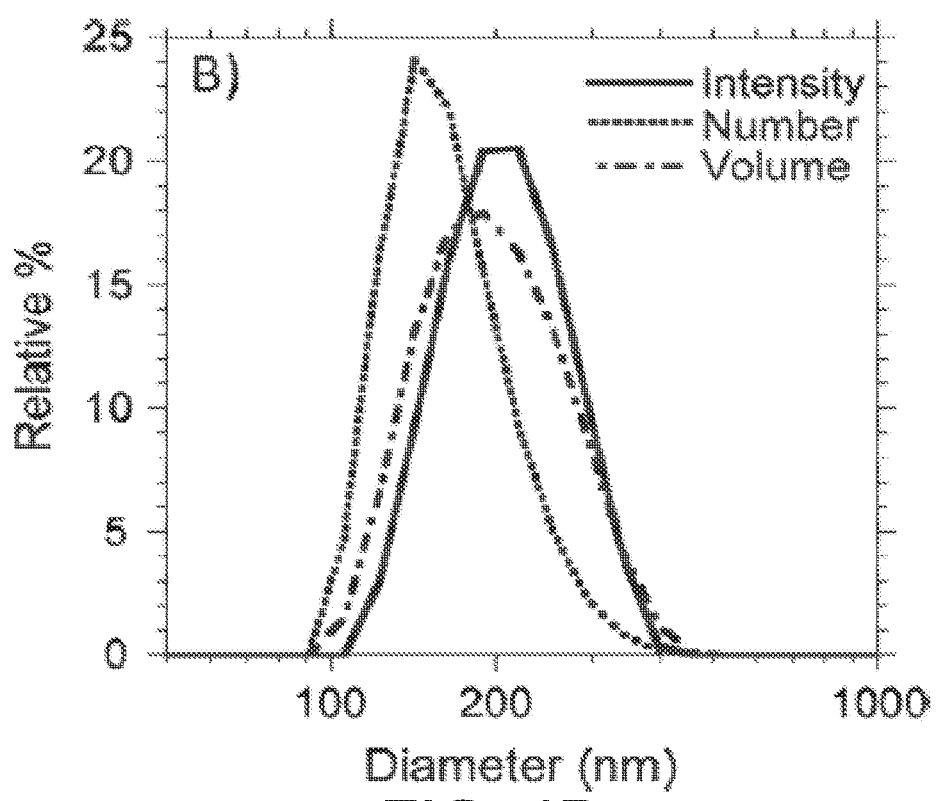
FIG. 4B provides data showing dynamic light scattering (DLS) measurements of the nanoparticles.
Figure 9A:
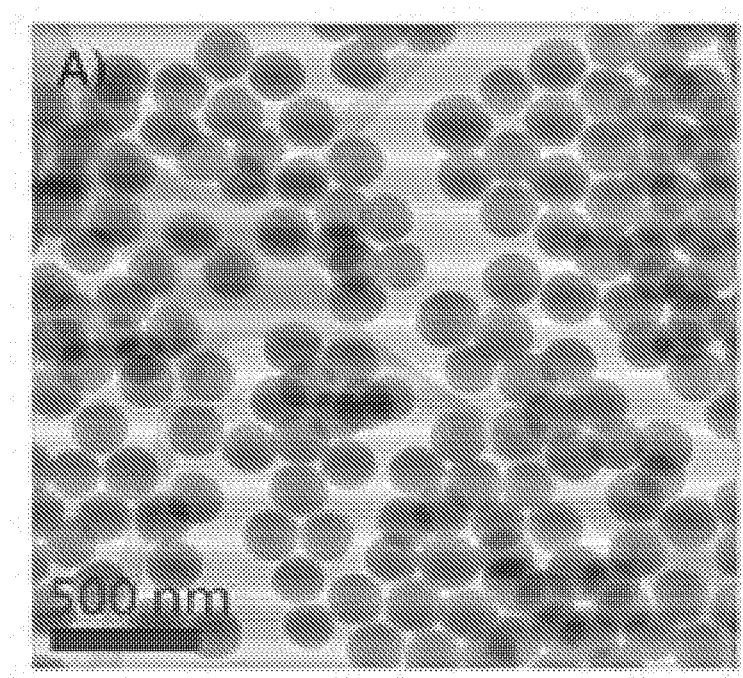
FIG. 9A provides a low-magnification TEM image of silica nanoparticles.

FIG. 4A shows the TEM results and FIG. 4B shows the DLS results of the MPS modified silica nanoparticles ($SiO_2$NPs) synthesized in this Example. These nanoparticles are monodisperse and the average size is 198±11 nm. The size may be tuned by changing the amount of TEOS, CTAB and pH. The particles were stable in water for months. MPS was used as a coupling agent for the silica particles. In DLS measurements, the Z average is 201 nm. These data show that silica nanoparticles have a narrow peak at around 200 nm, which confirmed that MPS-modified silica nanoparticles have an average diameter of 200 nm. As the TEM micrograph in FIG. 4A shows, no aggregation of silica nanoparticles occurred and MPS modification on the silica nanoparticles surface did not cause any damage to the well-dispersed silica nanoparticles. Successful MPS modification is useful for the silica nanoparticles to be encapsulated in polystyrene particles in the next step. Low magnification TEM image of the 200-nm $SiO_2$NPs are shown in FIG. 9A.

Figure 5A:
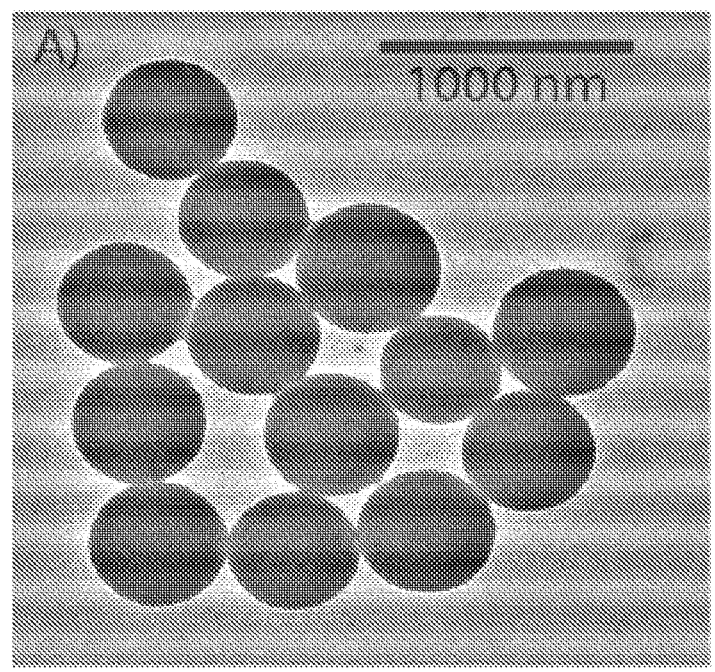
FIG. 5A provides a TEM image of polystyrene nanoparticles.
Figure 5B:
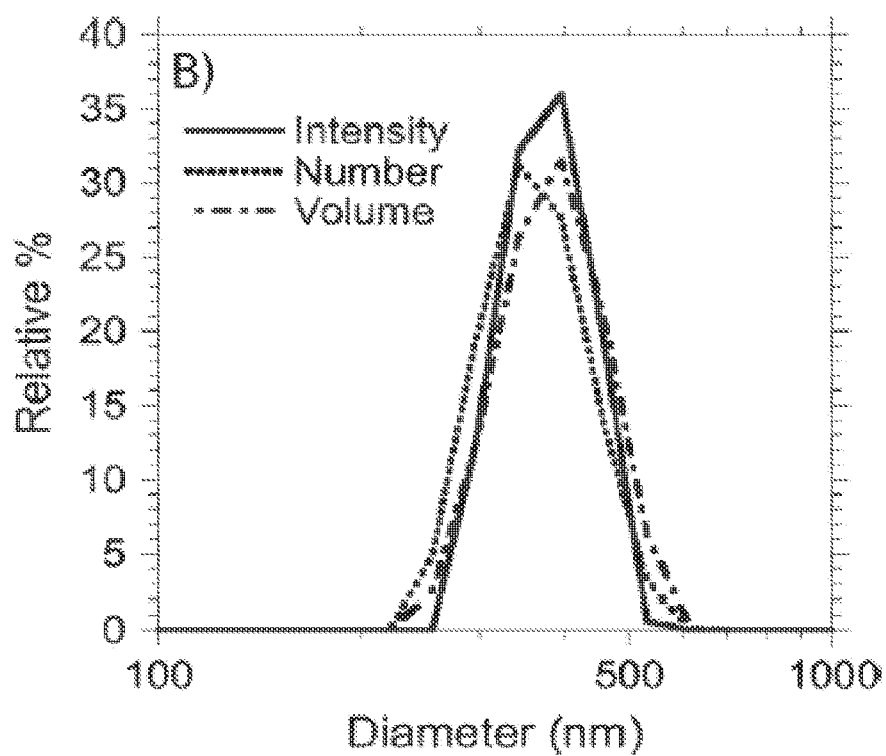
FIG. 5B provides data showing DLS measurements of the nanoparticles.
Figure 9B:
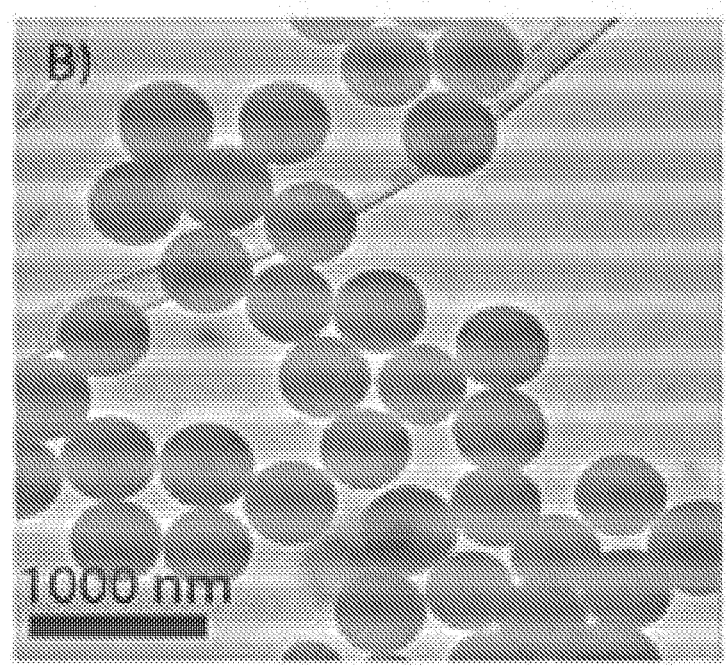
FIG. 9B provides a low-magnification TEM image of polystyrene nanoparticles.

Polystyrene (PS) particles may be made following the methods described previously. FIG. 5A shows a TEM image of the particles, which are 526 nm±17 nm. The Z average of DLS measurements is 418 nm, as illustrated in FIG. 5B. The size difference obtained by TEM and DLS may be caused by the refractive index used for PS in the DLS measurements and the sampling nature by TEM. Low magnification TEM image of the sample is shown in FIG. 9B. The particle surface may be passivated with ligands (acrylic acid). During the polymerization, styrene monomers were polymerized with acrylic acid as co-monomer. The resulting polymer particles were covered with carboxylic groups and were negatively charged. The cationic surfactant CTAB molecules as structure directing agent were adsorbed on the acidic functionalized latex surfaces through electrostatic attraction. In dispersion polymerization, polystyrene particles were prepared with anionic radical initiator potassium persulfate as an initiator in water and acrylic acid as a co-monomer. Because acrylic acid is hydrophilic, polystyrene chains with small amounts of acrylic acid tend to exist inside the particles in the aqueous solution and the acrylic acid-enriched chains tend to situate at the water-particle interface. The resulting polystyrene-acrylic acid latex is electrostatically and sterically stabilized.

Figure 6A:
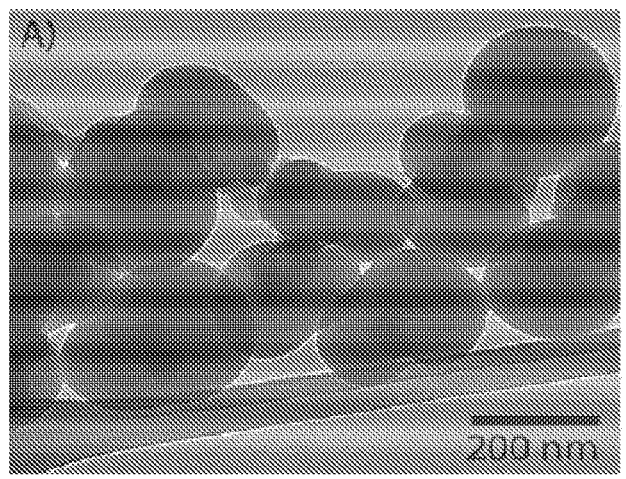
FIG. 6A provides a TEM image of multiple $SiO_2$ nanoparticles coated with polystyrene.
Figure 6B:
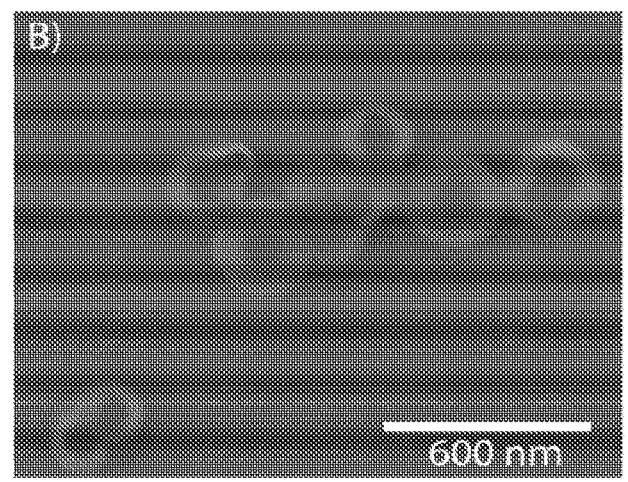
FIG. 6B provides a scanning electron micrograph (SEM) image of multiple $SiO_2$ nanoparticles coated with polystyrene.
Figure 6C:
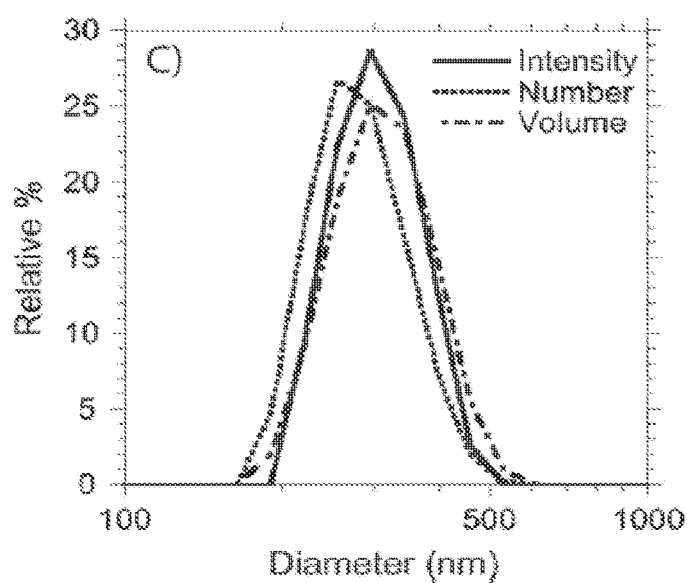
FIG. 6C provides data showing DLS measurements of the multiple $SiO_2$ nanoparticles coated with polystyrene.
Figure 10:
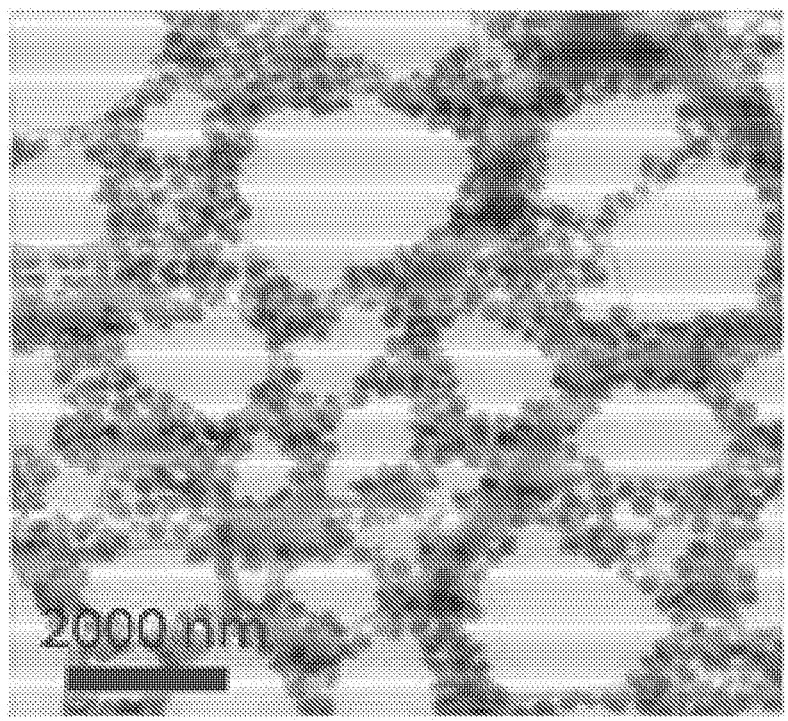
FIG. 10 provides a low-magnification TEM image of silica nanoparticles trapped in polystyrene nanoparticles.
Figure 11A:
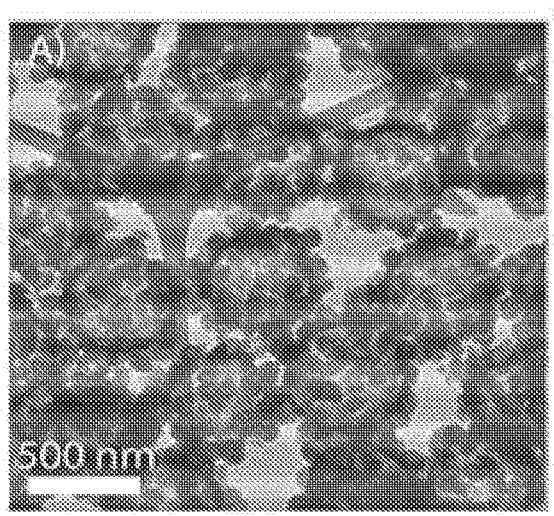
FIG. 11A, FIG. 11B, FIG. 11C, FIG. 11D, FIG. 11E, and FIG. 11F provide low magnification TEM images corresponding to the particles shown in FIGS. 7A-7F.
Figure 11B:
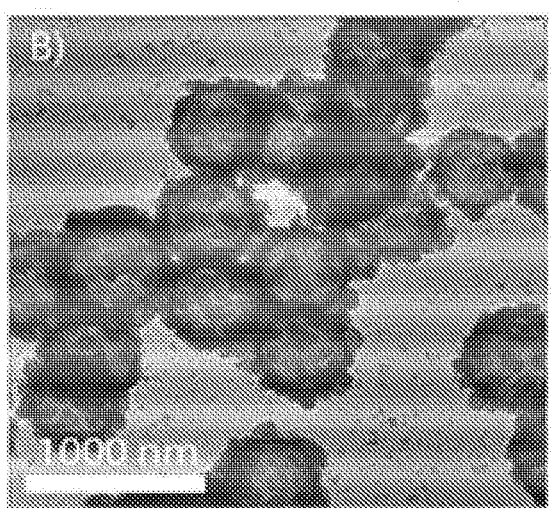
Figure 11C:
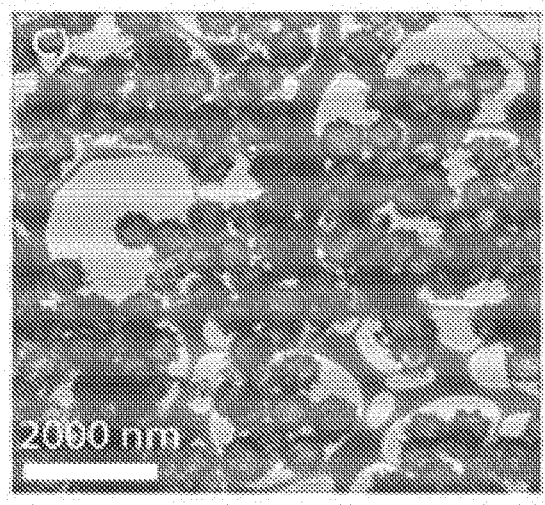
Figure 11D:
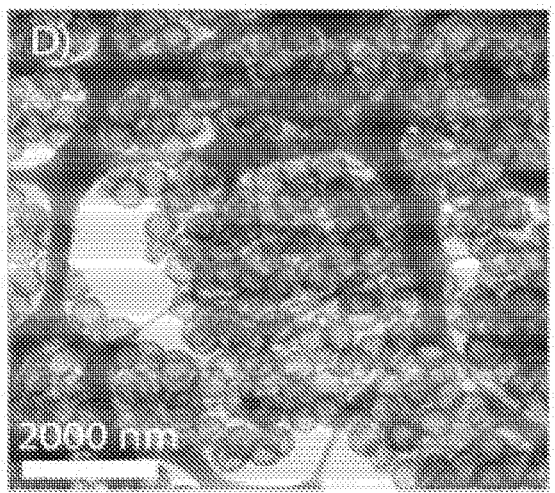
Figure 11E:
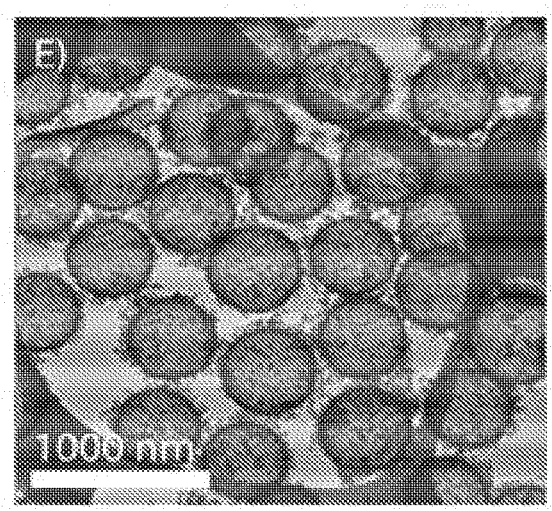
Figure 11F:
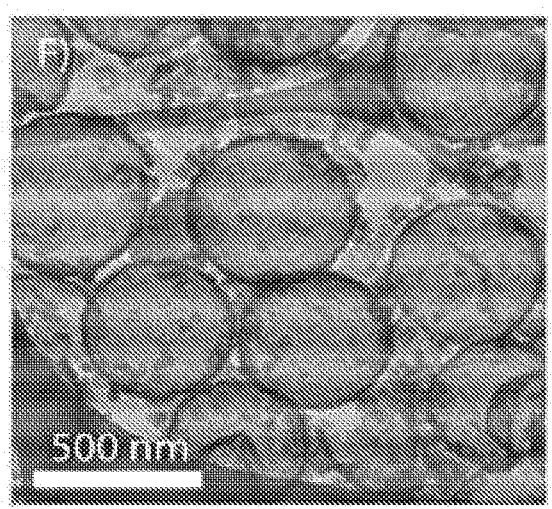

FIGS. 6A and 6B show the results of trapping multiple silica nanoparticles in PS particles. We chose 40-nm silica nanoparticles to demonstrate the trapping process. 200-nm silica nanoparticles may be similarly trapped in much larger PS particles. In the images, the diameter of PS coated silica composite particles is about 231±46 nm. The silica NPs inside is about 40 nm. As TEM and SEM images suggest, the 40 nm modified silica NPs was successfully encapsulated inside the polystyrene. Z average of DLS results (FIG. 6C) is 302 nm, which is possibly caused by the non-spherical dimension of the $SiO_2$NPs containing PS nanoparticles. In the TEM image (FIG. 6A), it is possible to see multiple silica nanoparticles. In the SEM image (FIG. 6B), the bumps of 40-nm silica nanoparticles extruding beyond the 200-nm PS particle surface are visible. These results show that it is possible to encapsulate multiple large nanoparticles in PS particles. The hydrophilic surface of the silica seed particles was prepared for a high polystyrene coating efficiency. Because of the C=C double bonds on the surface of the MPS grafted silica nanoparticles, the styrene monomer may be directly attached to the surface of those silica particles. A low magnification TEM image is shown in FIG. 10.

Figure 7A:
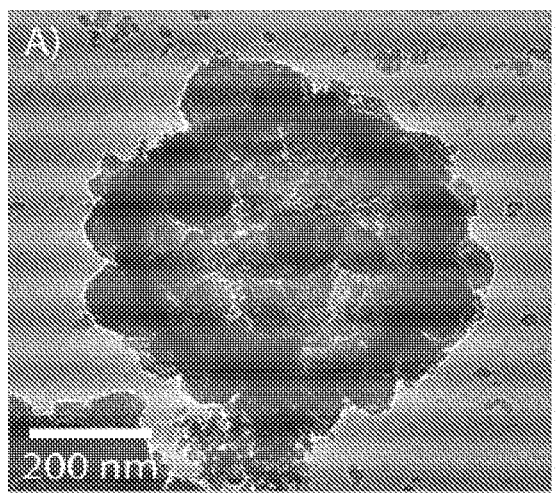
FIG. 7A, FIG. 7B, FIG. 7C, FIG. 7D, FIG. 7E, and FIG. 7F provide TEM images of silica coated polystyrene particles under several growth and etching conditions.
Figure 7B:
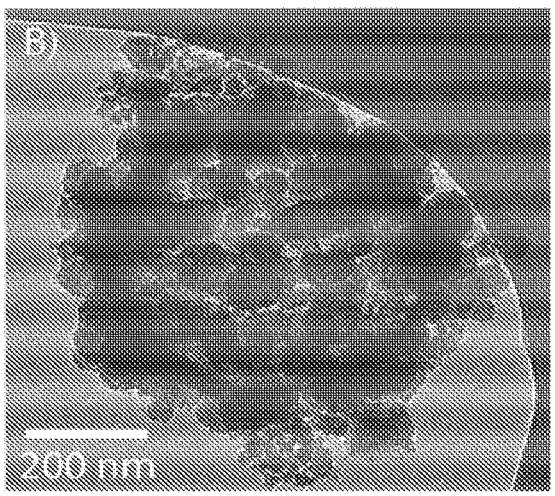

FIGS. 7A-7F shows a series of conditions under which hollow silica shells are synthesized. Several conditions with regard to synthesizing the shells and etching away the PS content after the growth were explored. When the condition of silica shell growth was not optimized, not all the silica was grown or condensed on the surface of PS particles, causing rough silica coating and silica nanoparticle growth away from the PS particles. Since the silica shells on polystyrene templates are porous, hollow silica shells are obtained by calcination or etching. By examining FIG. 7A and FIG. 7B, the high contrast TEM images indicate that polystyrene is completely removed via calcination. There is no aggregation of hollow silica shells after calcination. The shell thickness is about 40 nm, and the void diameter is about 500 nm. There were no broken shells, meaning that polystyrene templates were completely covered by silica. To prepare these two samples, 1.6 ml (FIG. 7A) and 1.0 ml (FIG. 7B) of TEOS were added as silica source at pH 10. Under this condition, there was significant aggregation of silica away from the PS particle surface. FIG. 7A and FIG. 7B show that when the TEOS concentration was decreased from 1.6 ml to 1 ml, the silica shell thickness still remained about 40 nm even though silica formation is not enough. The silica shell is "raspberry-like", which means that a further decrease of the silica amount or silica formation may be desirable.

Figure 7C:
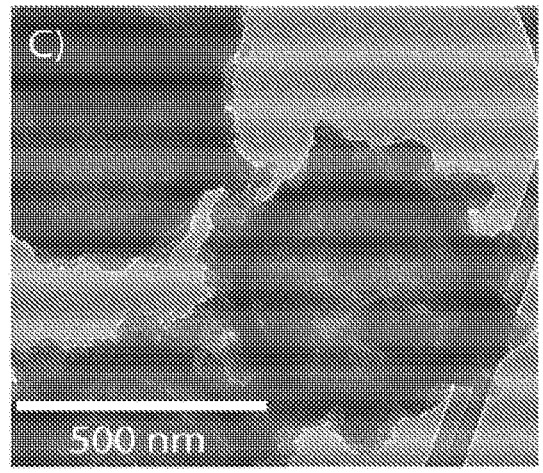
Figure 7D:
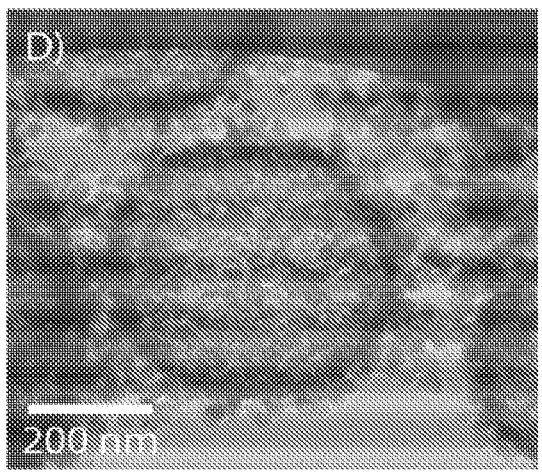

PS-covered silica shells were chemically etched. As shown in FIG. 7C, the products obtained after etching the polystyrene core with THF did not yield hollow shells, which suggest that the THF did not completely remove polystyrene core compared to the calcination. Calcination may, therefore, be a more effective way to obtain hollow silica shell. FIG. 7D shows the improved growth results. Compared with FIG. 7A and FIG. 7B, there is less silica aggregation on the surface of PS nanoparticle due to less TEOS and lower pH. By measuring the diameter of the bright circular part and darker ring-like part of the particles in the TEM images, the silica shell thickness is estimated to be about 10-20 nm, which decreased significantly compared with hollow silica shells in FIG. 7A and FIG. 7B. As FIG. 7D suggests, when the pH was adjusted from 10 to 9 while keeping the TEOS concentration at 1 ml, the silica shells are thinner and have a more uniform surface, which means less ammonia may be slowing down the TEOS hydrolysis and condensation. In FIG. 7D, the silica shell is clearly more uniform and has a thickness of 15 nm. However, there is still excessive silica that did not deposit on the silica shell. CTAB concentration was decreased to further improve the silica shell quality.

Figure 7E:
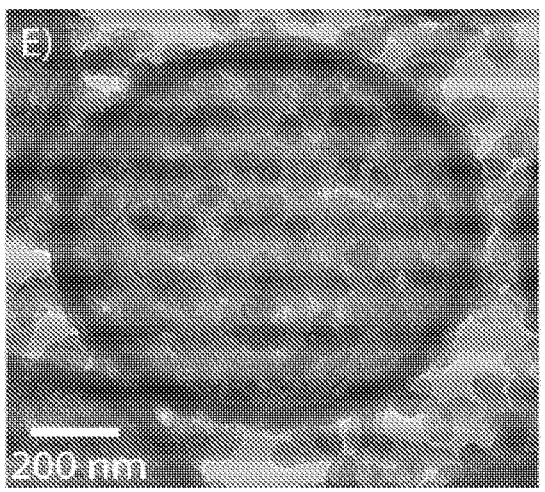
Figure 7F:
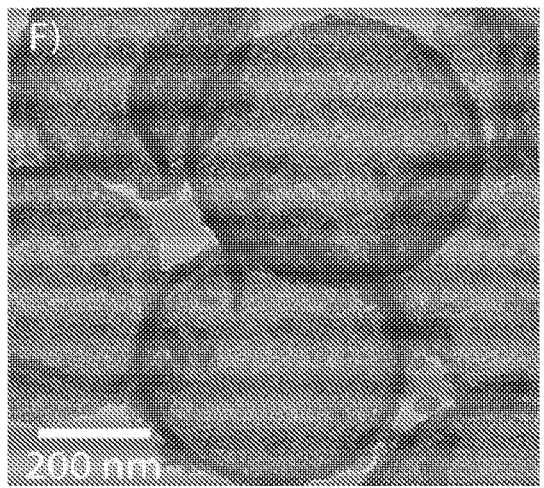

Knowing that calcination is a more effective method to remove PS content underneath the silica shells, the growth condition were further explored, and FIG. 7E and FIG. 7F shows the outcome. The CTAB concentration was further optimized while the pH was kept at 9 as suggested by the results shown in FIG. 7D. FIG. 7E and FIG. 7F shows the results using 50% and 30% of the original CTAB amount.

For 30% of the original amount of CTAB, the TEM image in FIG. 7F shows the most uniform silica deposition. There is no excess silica in the solution, and the silica shell is smooth. In FIG. 7E, the silica shells are more uniform and denser compared with those shown in FIGS. 7A-7B and FIGS. 7C-7D. There is a little excess silica left near the hollow silica shell, which may mean that all the added TEOS had hydrolyzed and condensed on the polystyrene surface. As the results suggest, the TEOS concentration, the CTAB concentration, and the pH may affect characteristics of silica shell surface. Low magnification TEM images are shown in FIGS. 11A-11F.

Figure 8A:
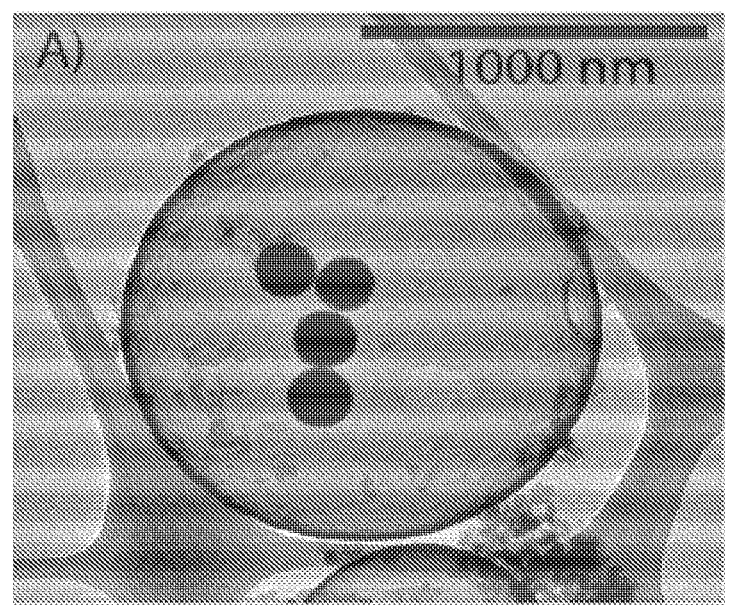
FIG. 8A provides a TEM image of large $SiO_2$ nanoparticles trapped in a hollow silica shell.
Figure 8B:
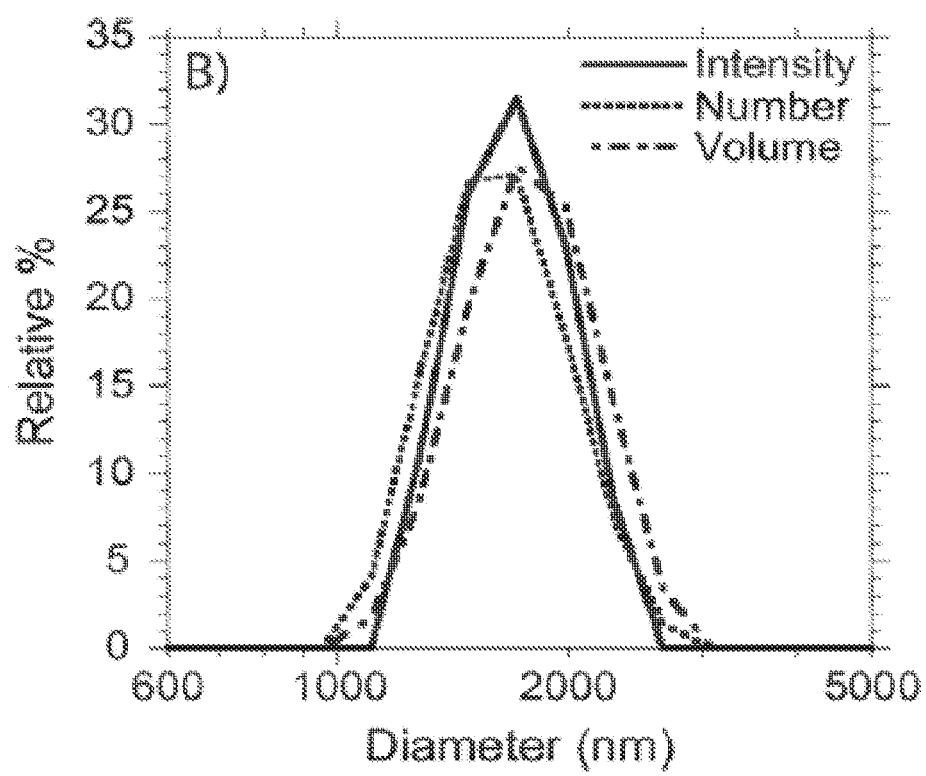
FIG. 8B provides data showing DLS measurements nanoparticles trapped in a hollow silica shell.
Figure 12:
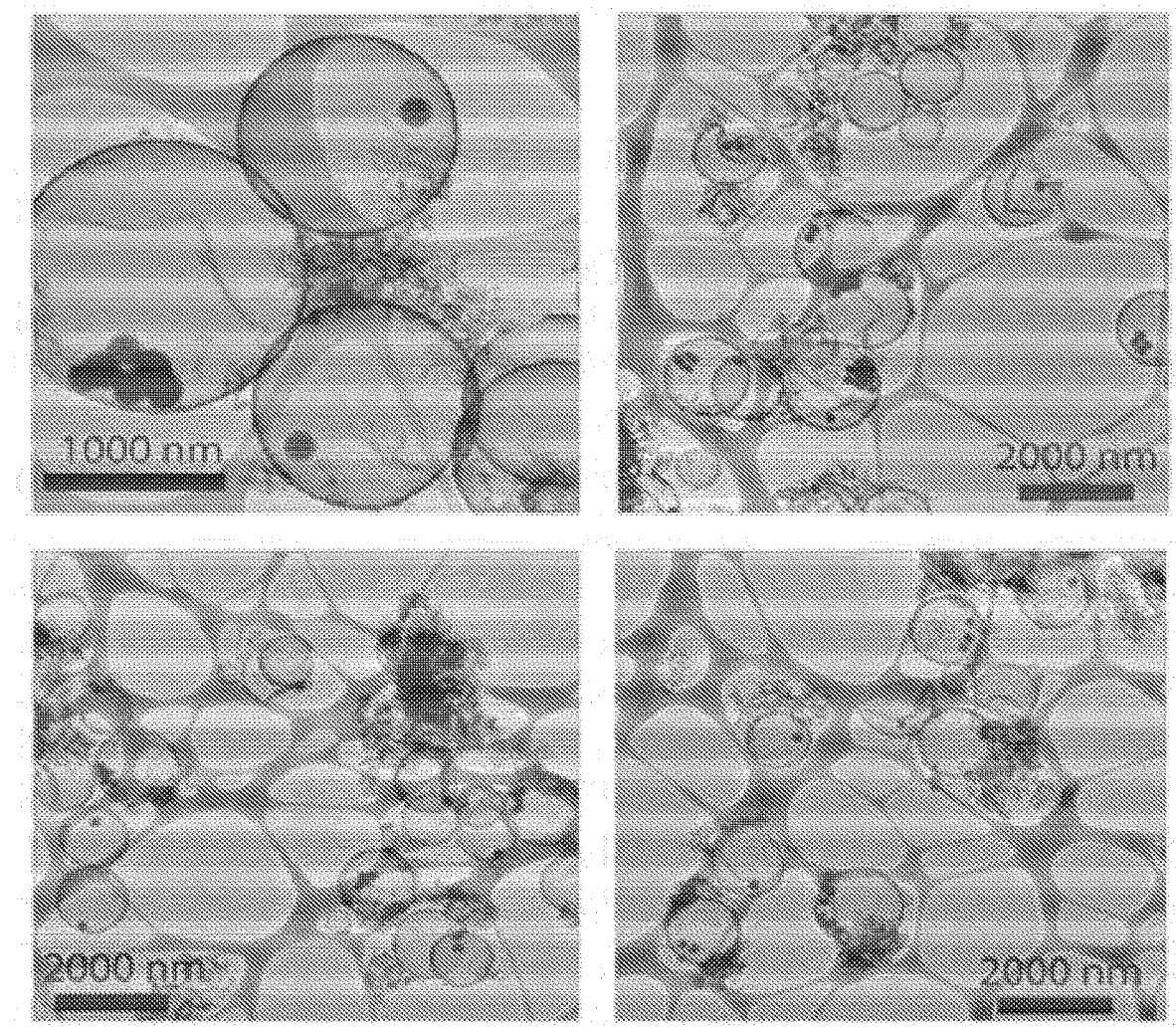
FIG. 12 provides low-magnification TEM images of silica nanoparticles trapped in thin silica hollow shells.

FIG. 8A shows the final product of multiple large (200 nm) $SiO_2$—NPs trapped in large silica hollow shells ($SiO_2HS$), giving rise to $mSiO_2NPs@SiO_2HS$. In this final step of synthesis, CTAB was used as the structure-directing agent for silica shell formation. PS is removed from $mSiO_2NPs@PS@SiO_2$ through calcination, which results in the formation of $mSiO_2NPs@SiO_2$. The extent of calcination influences the cleanness of assemblies. As FIG. 8A suggests, several 200 nm silica nanoparticles are encapsulated inside the hollow silica shell. All the silica nanoparticles are encapsulated inside the micron silica shell; no 200 nm silica nanoparticles are outside the hollow silica shell. The hollow silica shell is uniform and no broken shells appear in the image. This encapsulation process is useful as a model for magnetic particle encapsulation, which may be achieved by substitution of the $SiO_2$—NPs with magnetic nanoparticles, such as iron oxide nanoparticles or composite nanoparticles comprising iron oxide, such as silica coated iron oxide nanoparticles. When there is not enough polystyrene present to encapsulate every silica nanoparticle, multiple silica nanoparticles were encapsulated in larger polystyrene nanoparticles. DLS results (FIG. 8B) agree with the TEM measurements, both showing 1.7 μm shells. Low magnification TEM images of the products are shown in FIG. 12. Not all the shells have multiple $SiO_2$—NPs, although it is possible to purify and/or harvest only the shells with multiple $SiO_2$—NPs as shown in FIG. 8A.

It may be useful to control the surface of the intermediate species, such as that of the 200-nm silica nanoparticles and large polystyrene particles, to successfully synthesize the encapsulation product. In the approach described in this Example, monodisperse silica particles were prepared by Stöber method, and then MPS was grafted as a coupling agent. An advantage of Stöber synthesis is the possibility to functionalize the particles. In fact, the synthesis may be performed in presence of organo-alkoxysilanes, producing particles with different surface properties. Because the alkylate chain of MPS is hydrophobic, MPS grafted onto the surface of silica nanoparticles makes it easier to be embedded in PS particles. Furthermore, trimethoxylsilyl groups may be hydrolyzed and be condensed with the silanol groups at the surface of silica particles.

After surface modification, the surface of silica seed particles may induce polystyrene coating because of the C=C double bonds on the surface. Styrene monomer absorption onto the grafted silica and polymerization may occur in the presence of grafted silica nanoparticles. It is shown here that dispersion polymerization is a convenient method to prepare monodisperse composite particles in a one-step reaction. The initial reaction mixture of the polymerization reaction is a one-phase system, not an emulsion.

Successful silica coating of PS particle process may be due, at least in part, to electrostatic attraction. When ungrafted polystyrene spheres are used as templates and CTAB is used as a wall structure-directing agent, the weak interaction between polystyrene spheres and CTAB molecules do not induce uniform deposition of the siliceous micelles produced by hydrolysis of TEOS. When polystyrene-acrylic acid spheres are prepared via dispersion polymerization, they are negatively charged with carboxylic groups. The cationic surfactant CTAB molecules may be adsorbed on the functionalized acidic surfaces through electrostatic forces as structure directing agent. To form the silica layer, TEOS is introduced, which immediately starts to hydrolyze and condense. The absorbed layers of the cationic surfactant CTAB attract negatively charged $Si(OH)_4$ via electrostatic force. Deposition and coalescence continue until polystyrene particles are completely encapsulated in a compact silica layer. This is why it may be useful to functionalize the surface of PS particles.

Although hollow shells may be obtained by dispersing the core-shell particles in an etchant, such as strong base, HF, THF, or toluene, the results described above demonstrate that calcination may be a better method. The solvent passes through the pores on silica shell and dissolves the polymer component. The permeability of the shells decreases with the shell thickness. Comparing FIGS. 7A-7B and FIGS. 7C-7D, the difference between calcination and etching may be seen on the same core-shell structure and that calcination is more effective in completely removing polystyrene. The difference in results from chemical etching may be caused by the slower diffusion of content through the porous silica shell.

FIG. 8A confirms the successful encapsulation of 200 nm silica nanoparticles inside the micron-scale hollow silica shell. The shell is about 1700 nm in diameter. In a single micron-scale silica shell, there are multiple grafted silica nanoparticles. This means that, during the dispersion polymerization process, the density of large silica particles is high enough and there is not enough styrene to encapsulate single silica nanoparticles. Encapsulating multiple large silica nanoparticles inside micron-sized shells sets an example for encapsulating other materials. The large shells also ensure enough mobility of the encapsulated particles. It is also possible to embed other species in the large nanoparticles. For example, magnetic nanoparticles may be embedded inside silica nanoparticles.

This Example described the synthesis of hollow silica shells and encapsulation of silica particles inside hollow silica shells. For hollow silica shells, polystyrene-acrylic acid latex spheres were prepared as templates and CTAB as surfactant. TEOS was introduced for the uniform deposition of silica layers. Hollow silica shells were obtained by removing latex templates through calcination. For encapsulating silica particles inside hollow silica shells, dispersion polymerization was performed in the presence of MPS modified silica particles. This was followed by silica coating and removing the polystyrene content. Each hollow composite contains several silica particle beads. This Example demonstrates the encapsulation of multiple, large nanoparticles in micron-sized hollow silica shells in water medium.

V. References (1) Sondi, I.; Fedynyshyn, T. H.; Sinta, R.; Matijevic, E. Langmuir 2000, 16, 9031.
(2) Bourgeat-Lami, E.; Lang, J. J. Colloid Interface Sci. 1998, 197, 293.
(3) Stober, W.; Fink, A.; Bohn, E. J. Colloid Interface Sci. 1968, 26, 62.
(4) Qi, D. M.; Bao, Y. Z.; Weng, Z. X.; Huang, Z. M. Polymer 2006, 47, 4622.
(5) Ding, X. F.; Zhao, J. Z.; Liu, Y. H.; Zhang, H. B.; Wang, Z. C. Mater. Lett. 2004, 58, 3126.
(6) Lee, C. S.; Chang, H. H.; Bae, P. K.; Jung, J.; Chung, B. H. Macromol. Biosci. 2013, 13, 321.
(7) Kobayashi, Y.; Horie, M.; Konno, M.; Rodriguez-Gonzalez, B.; Liz-Marzan, L. M. J. Phys. Chem. B 2003, 107, 7420.
(8) Ohnuma, A.; Cho, E. C.; Jiang, M.; Ohtani, B.; Xia, Y. N. Langmuir 2009, 25, 13880.
(9) Ohnuma, A.; Cho, E. C.; Camargo, P. H. C.; Au, L.; Ohtani, B.; Xia, Y. N. J. Am. Chem. Soc. 2009, 131, 1352.
(10) Feyen, M.; Weidenthaler, C.; Schuth, F.; Lu, A. H. J. Am. Chem. Soc. 2010, 132, 6791.
(11) Xing, S. X.; Feng, Y. H.; Tay, Y. Y.; Chen, T.; Xu, J.; Pan, M.; He, J. T.; Hng, H. H.; Yan, Q. Y.; Chen, H. Y. J. Am. Chem. Soc. 2010, 132, 9537.
(12) Okada, A.; Nagao, D.; Ishii, H.; Konno, M. Soft Matter 2012, 8, 3442.
(13) Chen, D.; Li, L. L.; Tang, F. Q.; Qi, S. O. Adv. Mater. 2009, 21, 3804.
(14) Sandberg, L. I. C.; Gao, T.; Jelle, B. P.; Gustaysen, A. Advances in Materials Science and Engineering 2013.
(15) Zhang, Q.; Zhang, T. R.; Ge, J. P.; Yin, Y. D. Nano Lett. 2008, 8, 2867.
(16) Lu, Y.; McLellan, J.; Xia, Y. N. Langmuir 2004, 20, 3464.
(17) Mashimo, M.; Ji, Q. M.; Ishihara, S.; Sakai, H.; Abe, M.; Hill, J. P.; Ariga, K. Chem. Lett. 2011, 40, 840.
(18) Ge, C.; Zhang, D. Z.; Wang, A. L.; Yin, H. B.; Ren, M.; Liu, Y. M.; Jiang, T. S.; Yu, L. B. J. Phys. Chem. Solids 2009, 70, 1432.
(19) Song, L. Y.; Ge, X. W.; Wang, M. Z.; Zhang, Z. C. J. Non-Cryst. Solids 2006, 352, 2230.
(20) Fujiwara, M.; Shiokawa, K.; Tanaka, Y.; Nakahara, Y. Chem. Mater. 2004, 16, 5420.
(21) Zhang, L. D.; Liu, W. L.; Xu, W. H.; Yao, J. S.; Zhao, L.; Wang, X. Q.; Wu, Y. Z. Appl. Surf. Sci. 2012, 259, 719.
(22) Hah, H. J.; Um, J. I.; Han, S. H.; Koo, S. M. Chem. Commun. 2004, 1012.
(23) Cavaliere-Jaricot, S.; Darbandi, M.; Nann, T. Chem. Commun. 2007, 2031.
(24) Wang, P. H.; Pan, C. Y. Colloid Polym. Sci. 2002, 280, 152.

What is claimed is:

1. A composite photonic material comprising:
   a hollow shell comprising an oxide material; and
   a plurality of photonic nanoparticles comprising a magnetic material, wherein the plurality of photonic nanoparticles are disposed within the hollow shell, wherein the plurality of photonic nanoparticles are adapted to align in a presence of a magnetic field, wherein the plurality of photonic nanoparticles are adapted to be randomly distributed when not in the presence of the magnetic field, wherein the plurality of photonic nanoparticles are adapted to reflect a first wavelength of electromagnetic radiation when randomly distributed, and wherein the plurality of photonic nanoparticles are adapted to reflect a second wavelength of electromagnetic radiation when aligned, the second wavelength being different than the first wavelength.

2. The composite photonic material of claim 1, further comprising:
   a solvent disposed within the hollow shell and surrounding the plurality of photonic nanoparticles.

3. The composite photonic material of claim 2, wherein the solvent comprises one or more members selected from the group consisting of $H_2O$, $C_6H_{14}$, $C_2H_6O_2$, $C_3H_8O$, $C_6H_{14}O$, and mineral oil.

4. The composite photonic material of claim 1, wherein the plurality of photonic nanoparticles are adapted to align in the presence of the magnetic field over a time scale of less than about 20 ms.

5. The composite photonic material of claim 1, wherein the oxide material is selected from the group consisting of $SiO_2$, $Al_2O_3$, and ZnO.

6. The composite photonic material of claim 1, wherein the magnetic material is selected from the group consisting of an iron oxide and an iron oxide composite material.

7. The composite photonic material of claim 1, wherein the photonic nanoparticles of the plurality of photonic nanoparticles are characterized by a diameter of about 10 nm to about 500 nm.

8. The composite photonic material of claim 1, wherein the hollow shell is characterized by a diameter of about 1 μm to about 10 μm.

9. A composite photonic material comprising:
a hollow shell comprising an oxide material;
a plurality of photonic nanoparticles comprising a magnetic material, wherein the plurality of photonic nanoparticles are disposed within the hollow shell, wherein the plurality of photonic nanoparticles are adapted to align in a presence of a magnetic field, wherein the plurality of photonic nanoparticles are adapted to be randomly distributed when not in the presence of the magnetic field, and wherein the plurality of photonic nanoparticles are adapted to align in the presence of the magnetic field over a time scale of less than about 20 ms; and
a solvent disposed within the hollow shell and surrounding the plurality of photonic nanoparticles.

10. The composite photonic material of claim 9, wherein the solvent comprises one or more members selected from the group consisting of $H_2O$, $C_6H_{14}$, $C_2H_6O_2$, $C_3H_8O$, $C_6H_{14}O$, and mineral oil.

11. The composite photonic material of claim 9, wherein the oxide material is selected from the group consisting of $SiO_2$, $Al_2O_3$, and ZnO.

12. The composite photonic material of claim 9, wherein the magnetic material is selected from the group consisting of iron, an iron oxide, and an iron oxide composite material.

13. The composite photonic material of claim 9, wherein the photonic nanoparticles of the plurality of photonic nanoparticles are characterized by a diameter of about 10 nm to about 500 nm.

14. The composite photonic material of claim 9, wherein the hollow shell is characterized by a diameter of about 1 μm to about 10 μm.

15. The composite photonic material of claim 9, wherein the plurality of photonic nanoparticles are adapted to reflect a first wavelength of electromagnetic radiation when randomly distributed, and wherein the plurality of photonic nanoparticles are adapted to reflect a second wavelength of electromagnetic radiation when aligned, the second wavelength being different than the first wavelength.

16. A composite photonic material comprising:
a hollow shell comprising an oxide material;
a plurality of photonic nanoparticles comprising a magnetic material, wherein the plurality of photonic nanoparticles are disposed within the hollow shell, and wherein the hollow shell is characterized by a diameter of about 1 μm to about 10 μm; and
a solvent disposed within the hollow shell and surrounding the plurality of photonic nanoparticles.

17. The composite photonic material of claim 16, wherein the solvent comprises one or more members selected from the group consisting of $H_2O$, $C_6H_{14}$, $C_2H_6O_2$, $C_3H_8O$, $C_6H_{14}O$, and mineral oil.

18. The composite photonic material of claim 16, wherein the plurality of photonic nanoparticles are adapted to align in a presence of a magnetic field, wherein the plurality of photonic nanoparticles are adapted to be randomly distributed when not in the presence of the magnetic field.

19. The composite photonic material of claim 18, wherein the plurality of photonic nanoparticles are adapted to reflect a first wavelength of electromagnetic radiation when randomly distributed, and wherein the plurality of photonic nanoparticles are adapted to reflect a second wavelength of electromagnetic radiation when aligned, the second wavelength being different than the first wavelength.

20. The composite photonic material of claim 18, wherein the plurality of photonic nanoparticles are adapted to align in the presence of the magnetic field over a time scale of less than about 20 ms.

21. The composite photonic material of claim 16, wherein the oxide material is selected from the group consisting of $SiO_2$, $Al_2O_3$, and ZnO.

22. The composite photonic material of claim 16, wherein the magnetic material is selected from the group consisting of iron, an iron oxide, and an iron oxide composite material.

23. The composite photonic material of claim 16, wherein the photonic nanoparticles of the plurality of photonic nanoparticles are characterized by a diameter of about 10 nm to about 500 nm.

* * * * *